(12) United States Patent
Endo et al.

(10) Patent No.: US 8,274,736 B2
(45) Date of Patent: Sep. 25, 2012

(54) TRANSMISSION-TYPE SCREEN, PROJECTION-TYPE DISPLAY DEVICE, AND IMAGE DISPLAYING METHOD

(75) Inventors: Takao Endo, Tokyo (JP); Yuzo Nakano, Tokyo (JP); Hayato Takeuchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 12/747,420

(22) PCT Filed: May 20, 2008

(86) PCT No.: PCT/JP2008/059251
§ 371 (c)(1),
(2), (4) Date: Jun. 10, 2010

(87) PCT Pub. No.: WO2009/075118
PCT Pub. Date: Jun. 18, 2009

(65) Prior Publication Data
US 2010/0290114 A1    Nov. 18, 2010

(30) Foreign Application Priority Data

Dec. 10, 2007  (WO) .................. PCT/JP2007/073760

(51) Int. Cl.
*G03B 21/60*   (2006.01)

(52) U.S. Cl. ....................................... 359/457; 359/443

(58) Field of Classification Search .................. 359/460, 359/559
See application file for complete search history.

(56) References Cited

U.S. PATENT DOCUMENTS

| 4,143,943 | A | * | 3/1979 | Rawson | 359/446 |
| 7,079,318 | B2 | * | 7/2006 | Shikama et al. | 359/457 |
| 7,242,536 | B2 | | 7/2007 | Suzuki et al. | |
| RE40,226 | E | * | 4/2008 | Miyata | 359/453 |

(Continued)

FOREIGN PATENT DOCUMENTS

JP   55-12980 A   1/1980

(Continued)

OTHER PUBLICATIONS

Eric G. Rawson et Al, Speckle-free rear-projection screen using two close screens in slow relative motion, J. Optical Society. of America., vol. 66, No. 11, Nov. 1976.*

(Continued)

*Primary Examiner* — Clayton E LaBalle
*Assistant Examiner* — Kevin Butler
(74) *Attorney, Agent, or Firm* — Oblon, Spivak, McClelland, Maier & Neustadt, L.L.P.

(57) ABSTRACT

A transmission-type screen includes an entering-side Fresnel lens that inflects image light from a light emitter toward a display side using a prism formed on a rear-surface side, which is a light-entering-surface side of the image light; a first light diffusing unit that is provided on the display side with respect to the entering-side Fresnel lens and diffuses the image light from the entering-side Fresnel lens; a second light diffusing unit provided on the display side with respect to the first light diffusing unit, diffuses the image light from the first light diffusing unit, causes the diffused image light to exit toward the display side, and configured to change a relative position thereof to the first light diffusing unit; and a second substrate that holds the second light diffusing unit while being provided on the display side with respect to the second light diffusing unit.

12 Claims, 18 Drawing Sheets

U.S. PATENT DOCUMENTS

| | | | |
|---|---|---|---|
| 7,986,457 B2 * | 7/2011 | Kinoshita et al. | 359/446 |
| 2007/0242351 A1 | 10/2007 | Seki et al. | |
| 2007/0263289 A1 | 11/2007 | Monoe et al. | |
| 2009/0067062 A1 | 3/2009 | Suzuki et al. | |
| 2010/0134883 A1 | 6/2010 | Endo et al. | |
| 2010/0188745 A1 | 7/2010 | Endo et al. | |

FOREIGN PATENT DOCUMENTS

| | | | |
|---|---|---|---|
| JP | 60 61738 | | 4/1985 |
| JP | 8-313865 A | | 11/1996 |
| JP | 1996313865 | * | 11/1996 |
| JP | 3465906 B2 | | 11/2003 |
| JP | 3606862 | | 1/2005 |
| JP | 2005 059641 | | 6/2005 |
| JP | 2006-301430 | * | 4/2006 |
| JP | 2006 209036 | | 8/2006 |
| JP | 2006-209036 | * | 8/2006 |
| JP | 2006 301430 | | 11/2006 |
| JP | 2006 343663 | | 12/2006 |
| JP | 2007 286347 | | 11/2007 |
| JP | 2007-286347 | * | 11/2007 |
| JP | 2007 286350 | | 11/2007 |
| JP | 2007 322734 | | 12/2007 |
| JP | 2007 334240 | | 12/2007 |

OTHER PUBLICATIONS

U.S. Appl. No. 12/908,267, filed Oct. 20, 2010, Endo, et al.
U.S. Appl. No. 12/359,652, filed Jan. 26, 2009, Endo, et al.
Decision of a Patent Grant issued Feb. 14, 2012, in Japanese Patent Application No. 2009-545360 (with English-language translation).

* cited by examiner

TRANSMISSION-TYPE SCREEN, PROJECTION-TYPE DISPLAY DEVICE, AND IMAGE DISPLAYING METHOD

TECHNICAL FIELD

The present invention relates to a transmission-type screen, a projection-type display device, and an image displaying method for displaying an image by projecting image light from a rear-surface side of the screen as seen from a viewer.

BACKGROUND ART

Projection-type display devices have been known as devices that are used for displaying an image and in each of which a Fresnel lens screen is combined with a diffusion sheet (i.e., a diffusion layer). Unlike Cathode Ray Tube (CRT) display devices and Plasma Display Panel (PDP) display devices, projection-type display devices are non-light-emitting-type display devices. A projection-type display device includes: an illumination optical system that, as a projector, guides light from a light source into a predetermined direction; a light bulb that is irradiated by the light guided by the illumination optical system and forms an image by adjusting the amount of light according to an image signal; a projection optical system that enlarges and projects the image that has been formed by the light bulb onto a screen.

Projection-type display devices include rear-surface projection-type display devices in which the image light is projected from the rear surface of the screen as seen from the viewer and front-surface projection-type display devices in which the image light is projected from the front of the screen as seen from the viewer. A transmission-type screen, which is used in the rear-surface projection-type display devices among these two types of display devices, includes a Fresnel lens screen that inflects the image light from the projector toward the viewer side and an image display element that forms an image with the image light from the Fresnel lens screen and enlarges the image light by applying a divergent angle thereto.

Generally speaking, Fresnel lenses are manufactured so as to have a pitch that is finer than a projected pixel (for example, one tenth of the pixel). Thus, the dimension in the thickness direction is extremely small (the thickness including a prism portion is, for example, hundreds of micrometers). Thus, to hold a Fresnel lens, it is necessary to use a substrate having a thickness of approximately 1 millimeter to 5 millimeters. The substrate is often formed of a resin such as Poly Methyl MethAcrylate (PMMA), Methyl methacylate Styrene (MS), Methyl methacylate Butadiene Styrene (MBS) or Polycarbonate (PC), or formed of glass. Also, in many situations, a Fresnel lens is formed directly on a substrate by using a light-curing resin or the like. An element that is made up of a Fresnel lens and a substrate is called a Fresnel lens screen. Such Fresnel lenses can be classified into light-entering-surface-side Fresnel lenses (hereinafter, "entering-side Fresnel lenses") in which the prisms are formed on the light-entering-surface side and light-exiting-surface-side Fresnel lenses (hereinafter, "exiting-side Fresnel lenses") in which the prisms are formed on the light-exiting-surface side. In addition, the image display element is, for example, a lenticular screen and at least includes a light diffusing means and a substrate.

The image display element has irregularities on the surface thereof and has a refractive index distribution, a phase distribution, and a transmittance distribution on the inside thereof. Thus, when the image light from the projector is viewed through a transmission-type screen, the image light has a fluctuation that is larger than the wavelength of the light. As a result, innumerable speckles (glares), some of which are bright and some of which are dark, are perceived on the transmission-type screen in a disorderly manner. These bright and dark speckles are generally called "speckles" or "scintillations" and can be a cause of image degradations.

As a countermeasure for such speckles (i.e., scintillations), some methods have been proposed such as a method by which a screen is oscillated (see Patent Document 1) or a method by which diffusion layers included in a screen are positioned apart from each other (see Patent Document 2).

Patent Document 1: Japanese Patent Application Laid-open No. 2006-343663
Patent Document 2: Publication of Japanese Patent No. 3606862

DISCLOSURE OF INVENTION

Problem to be Solved by the Invention

According to the former conventional technique described above, however, because the screen is oscillated, the housing and the other components hit one another, so that noise and abrasion can be caused from and on the screen. Because such noise, abrasion, and the like can be a cause of a malfunction of the screen, it is necessary to secure a spatial margin so that the screen can be oscillated. Further, because the screen may be deformed due to warping of the screen itself or may be deformed due to heat or moisture, it is also necessary to secure an additional spatial margin to cope with such deformations. As a result, the diffusion layers included in the screen need to be positioned apart from each other. According to the latter conventional technique described above, the diffusion layers included in the screen are positioned apart from each other, as a countermeasure for scintillations.

In the case where the gap between the diffusion layers included in a screen is arranged to be large as described above, the image becomes blurred while the light propagates from the first diffusion layer to the next diffusion layer in the screen. Thus, a problem arises where inconvenience of having low resolving power is caused.

In view of the circumstances described above, it is an object of the present invention to obtain a transmission-type screen, a projection-type display device, and an image displaying method for displaying an image having high resolving power, while mitigating image degradation caused by speckles.

Means for Solving Problem

In order to solve the problems and achieve the object, a transmission-type screen according to the present invention for displaying an image onto which image light from a light emitter is radiated from a rear-surface side thereof, which is an opposite side to an image display side, includes a Fresnel optical element that inflects the image light from the light emitter toward the display side using a prism formed on a rear-surface side thereof, which is a light-entering-surface side of the image light; a first substrate that holds the Fresnel optical element; a first light diffusing unit that is provided on the display side with respect to the Fresnel optical element and diffuses the image light from the Fresnel optical element; a second light diffusing unit that is provided on the display side with respect to the first light diffusing unit, diffuses the image light from the first light diffusing unit, causes the diffused image light to exit toward the display side, and is configured to change a relative position thereof to the first light diffusing unit; and a second substrate that is provided on the display side with respect to the second light diffusing unit and holds the second light diffusing unit.

Effect of the Invention

The transmission-type screen according to an aspect of the present invention diffuses the image light by using the first light diffusing unit and the second light diffusing unit. The first light diffusing unit is provided on the display side with respect to the Fresnel optical element. The substrate holding the second light diffusing unit is provided on the display side with respect to the second light diffusing unit. Thus, an advantageous effect is achieved where it is possible to display an image having high resolving power while mitigating image degradation caused by speckles.

EXPLANATIONS OF LETTERS OR NUMERALS

Figure 1:
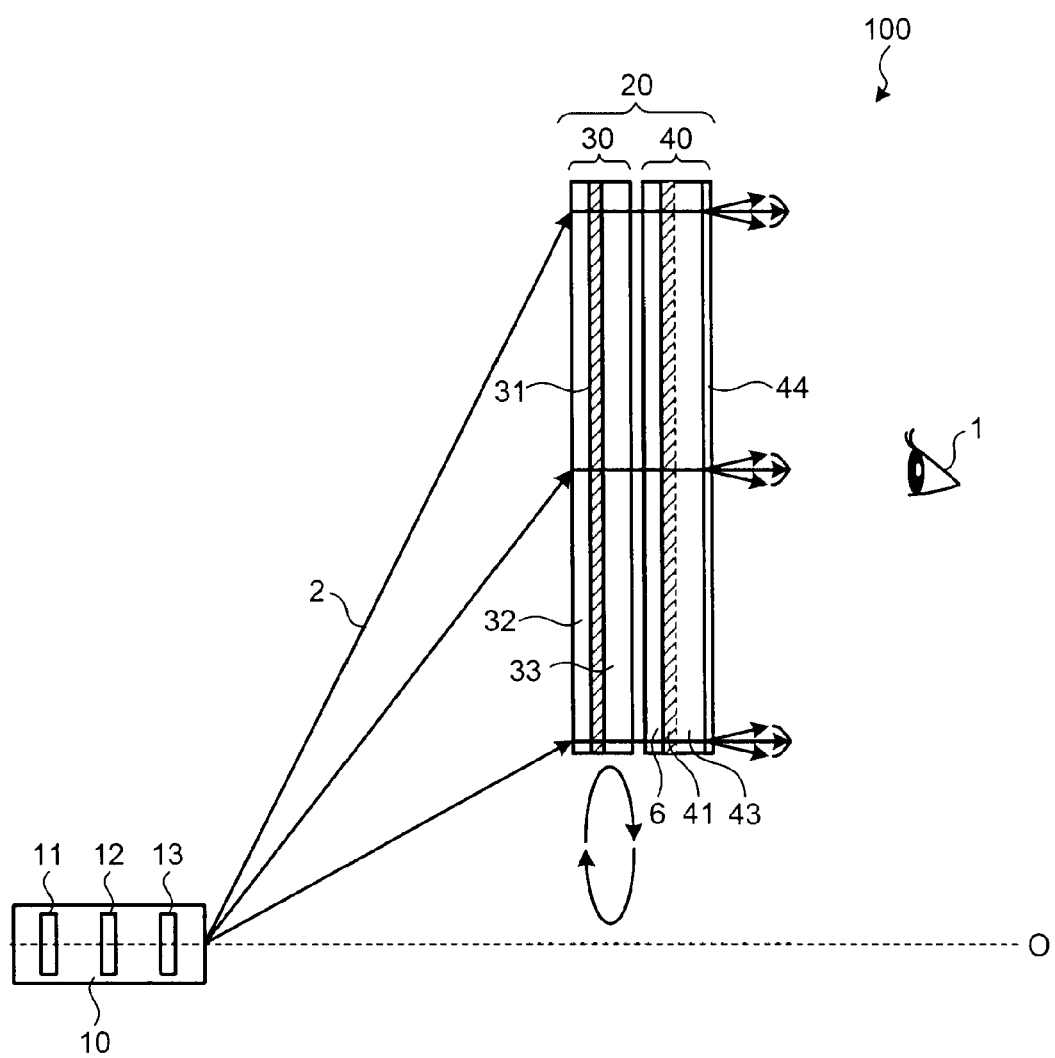
FIG. 1 is a drawing illustrating a configuration of a projection-type display device according to an embodiment of the present invention.

1: Viewer
2: Image light
3: Reflection mirror
4: Substrate
6: Lens element
9: Light source
10: Projector
11: Illumination optical system
12: Light bulb
13: Projection optical system
20: Transmission-type screen
30: Fresnel lens screen
31: First light diffusing unit
32: Entering-side Fresnel lens
33: First substrate
34: Combination-type Fresnel lens
35: Entering-side total-reflection Fresnel lens
36: Entering-side partially-total-reflection Fresnel lens
37, 61: Cylindrical lens
38: Light absorbing portion
39: Trapezoidal lens
40: Image display element
41: Second light diffusing unit
43: Second substrate
44: Surface treated layer
51: First refraction surface
52: Reflection surface
53: Second refraction surface
54: Non-light-entering surface
55: Tip-removed surface
71: Effective source
81: Crystalline lens
82: Retina
83: Pupil function
100, 101, 102, 103, 104: Projection-type display device
201: First protection layer
202: Second protection layer
203: Selective light transmitting/absorbing layer

BEST MODE(S) FOR CARRYING OUT THE INVENTION

In the following sections, exemplary embodiments of a transmission-type screen, a projection-type display device, and an image displaying method according to the present invention will be explained in detail with reference to the accompanying drawings. The present invention is not limited to the exemplary embodiments.

First Embodiment

FIG. 1 is a drawing illustrating a configuration of a projection-type display device according to an embodiment of the present invention. In FIG. 1, a cross-sectional configuration of a projection-type display device 100 is shown. The projection-type display device 100 includes a projector 10 and a transmission-type screen 20. The projection-type display device 100 is a display device of a rear-surface projection-type that displays an image by enlarging and projecting an image from the projector 10 onto the transmission-type screen 20.

The projection-type display device 100 according to a first embodiment of the present invention is constructed such that a first light diffusing unit (the first light diffusing unit) 31 and a second light diffusing unit (the second light diffusing unit) 41 included in the transmission-type screen 20 are provided within the transmission-type screen 20 so as to face inward and to be positioned closer to each other within the transmission-type screen 20. As a result, the distance between the first light diffusing means 31 and the second light diffusing means 41 is short.

The projector 10 includes an illumination optical system 11, a light bulb 12, and a projection optical system 13. The optical axis direction of the illumination optical system 11 is the direction toward the point of origin. The illumination optical system 11 guides illumination light from a light source 9 (explained later) to the light bulb 12. The light bulb 12 adjusts the amount of light from the illumination optical system 11 according to an image signal and forms an image. The projection optical system 13 enlarges and projects the image that has been formed by the light bulb 12 onto the transmission-type screen 20.

The transmission-type screen 20 includes a Fresnel lens screen 30 and an image display element 40 such as a lenticular screen. The Fresnel lens screen 30 is provided on the rear-surface side (i.e., the light-emitter side), as seen from a viewer 1. The image display element 40 is provided on the front-surface side (i.e., the viewer side), as seen from the viewer 1.

The Fresnel lens screen 30 includes: a light-entering-surface-side Fresnel lens (hereinafter, "entering-side Fresnel lens") (the Fresnel optical element) 32; a first substrate 33 that holds the entering-side Fresnel lens 32; and the first light diffusing means 31 that is provided on the viewer 1 side with respect to the entering-side Fresnel lens 32.

The image display element 40 includes a second substrate 43 and the second light diffusing means 41. Within the image display element 40, the second light diffusing means 41 is provided on the light-emitter side (i.e., the projector 10 side) with respect to the second substrate 43. A lens element 6 is formed on the surface of the image display element 40 on the light-emitter side. Also, a surface treated layer 44 is formed on the surface of the image display element 40 on the viewer side.

The first light diffusing means 31 and the second light diffusing means 41 each diffuse light. For example, the first light diffusing means 31 and the second light diffusing means 41 are manufactured such that light can be diffused on irregularities formed on the surfaces of the first light diffusing means 31 and the second light diffusing means 41. Alternatively, the first light diffusing means 31 and the second light diffusing means 41 may be manufactured so that fine particles are present therein in a mixed manner to diffuse light by the fine particles, the fine particles having various diameters and having refractive indices that are different from those of the media with which the first light diffusing means 31 and the second light diffusing means 41 are formed.

In the example shown in FIG. 1, the second light diffusing means 41 and the second substrate 43 are shown as separate members; however, another arrangement is acceptable in which the second substrate 43 includes the second light diffusing means 41. In that situation, for example, fine particles having a refractive index that is only slightly different (e.g., $\Delta n=0.01$ to $0.05$) from the refractive index of the second substrate 43 are blended into the light-emitter side of the second substrate 43, so that the layer having the fine particles blended therein can serve as the light diffusing means 41. The length of each of the irregularities or the fine particles formed on the first light diffusing means 31 and the second light diffusing means 41 is, for example, approximately 1 micrometer to 50 micrometers and is longer than the wavelength of visible light (approximately 380 nanometers to 780 nanometers).

In the description above, the example in which the lens element 6 and the surface treated layer 44 are formed on the image display element 40 is explained; however, another arrangement is acceptable in which the image display element 40 does not have the lens element 6 or the surface treated layer 44.

In the projection-type display device 100, the light that has been emitted from the light emitter having a finite size and has been guided by the illumination optical system 11 illuminates the light bulb 12 that forms the image. The projection optical system 13 enlarges and projects the image onto the transmission-type screen 20.

Not only when, needless to say, the light emitter is a coherent light source such as a laser light source, but also when the light emitter is an incoherent light source such as an ultra-high pressure mercury lamp, coherence is caused while the light goes through the illumination optical system 11 and the projection optical system 13, so that the light becomes partially-coherent light. A complex degree of coherence may be used as a physical quantity that expresses the coherence. Mathematically, the complex degree of coherence can be expressed as a relative relationship between an effective source and an auto-correlation of pupil functions. Propagation of such coherence is related to a transmission cross coefficient. Thus, when a lens has been designed, propagation properties of the coherence are also determined at the same time.

For example, by having an arrangement in which the two light diffusing units (i.e., the first light diffusing means 31 and the second light diffusing means 41) are positioned apart from each other, the image becomes blurred because the wavefront of the light gets disturbed; however, when the wavefront gets disturbed, the complex degree of coherence becomes lower. As a result, by having the arrangement in which the two light diffusing means 31 and 41 are positioned apart from each other, it is possible to reduce inconvenience of glares such as scintillations. Further, it is known that making an aperture of a lens larger enhances the image resolving power. To put it the other way around, when a smaller lens is used, the image resolving power becomes lower and, as a result, the image becomes blurred and the glares decrease.

When the light diffusing means 31 and 41 are illuminated with partially-coherent light, a plurality of intensity distributions from a first intensity distribution to an N'th intensity distribution (where N is a natural number) overlap one another, the plurality of intensity distributions including the first intensity distribution that is generated by overlapping amplitude distributions of a first wavefront and the N'th intensity distribution that is generated by overlapping amplitude distributions of an N'th wavefront. As a result, the viewer 1 perceives, in a disorderly manner, innumerable bright and dark speckles that can be classified as subjective speckles. For this reason, even if an incoherent light source like a lamp light source having a continuous spectrum that is not monochromatic light or having a spatial magnitude is being used, inconvenience of glares such as scintillations is observed.

Next, an example in which the position of the transmission-type screen 20 is changed to reduce scintillations will be explained. In the following sections, an example in which the position of the Fresnel lens screen 30, which includes the first light diffusing means 31, is changed will be explained; however, it is sufficient if the positions of the two light diffusing units (i.e., the first light diffusing means 31 and the second light diffusing means 41) are relatively changed. Thus, it is also acceptable to change the position of the image display element 40, which includes the second light diffusing means 41.

Figure 2:
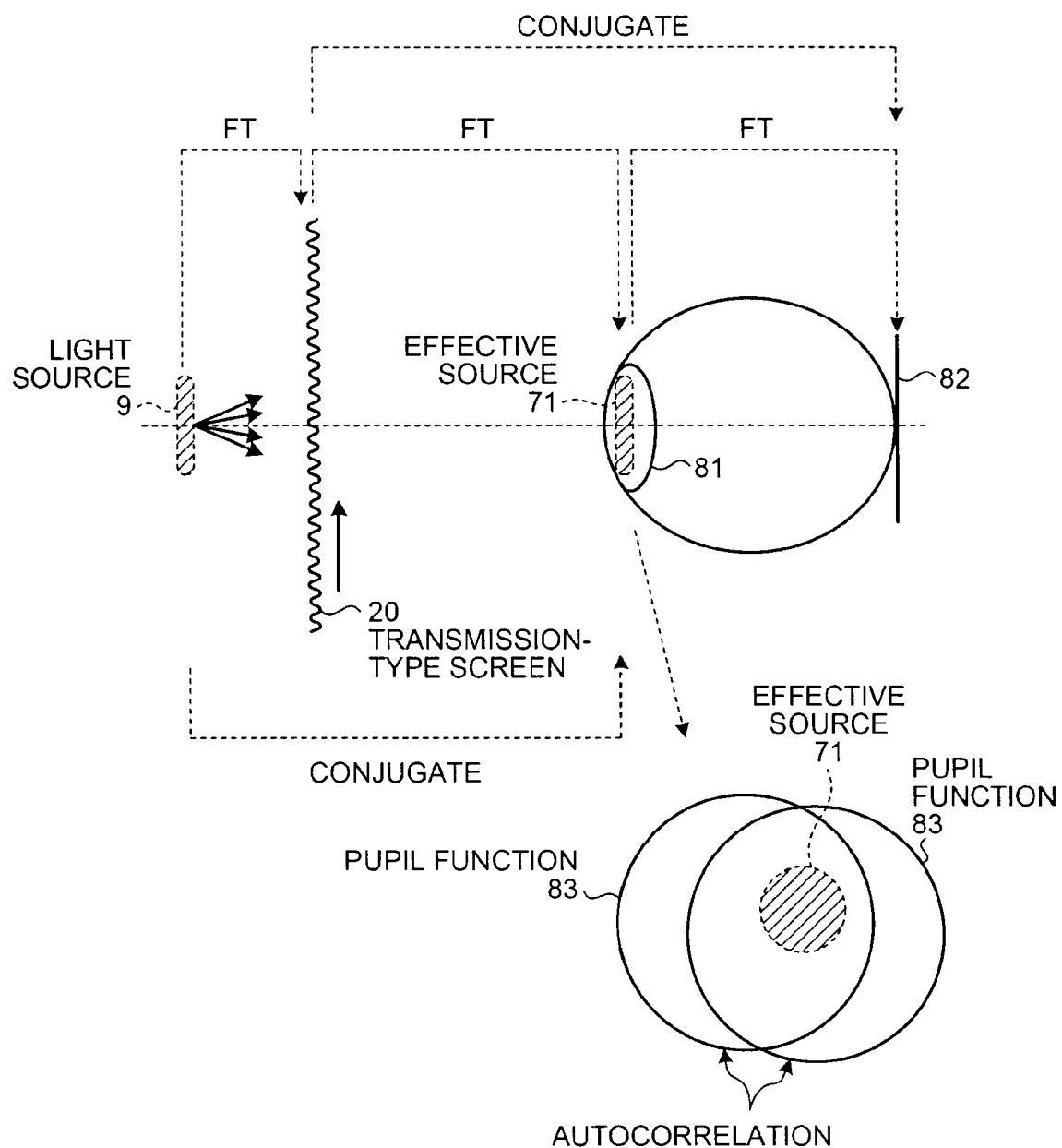
FIG. 2 is a drawing explaining propagation of coherence.

First, propagation of coherence will be explained. FIG. 2 is a drawing explaining propagation of coherence. The light from the light source 9, which is a light emitter, is guided to the light bulb 12 by the illumination optical system 11, so as to illuminate the light bulb 12. The image that has been formed by the light bulb 12 is enlarged and projected by the projection optical system 13 onto the transmission-type screen 20 that is in a conjugate positional relationship. In the following sections, to make it easier to understand, the illumination optical system 11, the light bulb 12, and the projection optical system 13 that are positioned between the light source 9 and the transmission-type screen 20 are not shown in the drawing. The components are simply shown as if the light source 9 illuminates the transmission-type screen 20 (which is in a conjugate relationship with the light bulb 12). An effective source 71 is a virtual light source obtained based on the complex degree of coherence (i.e., a virtual light source that is formed in a crystalline lens 81 of the human eye.) In the example shown in FIG. 2, the effective source 71 is in a conjugate position with the light emitter, which is the light source 9. Also, a retina 82 of the human eye is in a conjugate position with the transmission-type screen 20.

The light (i.e., the partially-coherent light) from the light source 9 is viewed by the viewer after having gone through the transmission-type screen 20. Thus, the size of the effective source 71 is dependent on optical properties (e.g., a degree of haze) of the transmission-type screen 20. Further, the complex degree of coherence of the light is expressed as a relative relationship between the effective source 71 and an autocorrelation of the pupil functions 83. For this reason, in the case where the effective source 71 is relatively large with respect to the pupil functions 83, the light from the effective source 71 is more incoherent. Conversely, in the case where the effective source 71 is relatively small with respect to the pupil functions 83, the light from the effective source 71 is more coherent.

Even if the position of the transmission-type screen 20 is changed, the relative relationship between the effective source 71 and the pupil functions 83 does not change. Thus, the momentary (or instantaneous) coherence of the light does not change. For this reason, even if the position of the transmission-type screen 20 is changed, it is not possible to eliminate the glares, but rather, only the intensity pattern of the glares changes (or the intensity pattern of the glares changes the position thereof). It should be noted, however, that when the position of the transmission-type screen 20 is changed in this manner, the light intensity is averaged in a predetermined period of time. Thus, when the transmission-type screen 20 is being used, it is possible to reduce the glares with a moving average of the intensity of the glares by changing the position.

To change the position of the transmission-type screen 20, it is not sufficient to just apply any positional change to the transmission-type screen 20. First, an example in which only one light diffusing unit (i.e., only the first light diffusing means 31 of which the position is to be changed) is included in the transmission-type screen 20 will be explained. In the case where the first light diffusing means 31 is moved sufficiently slowly (i.e., several hertz) in comparison with a response speed of the eye (i.e., approximately 1/30 seconds=30 hertz), the luminescence points of the glares move according to the change of the position of the Fresnel lens screen 30, while keeping the pattern of the glares the same. When the same pattern moves slowly, the human eyes inevitably follow the pattern consciously. As a result, when the position of the first light diffusing means 31 is changed at a low speed, a problem arises where the viewer perceives the glares.

To cope with this problem, according to the first embodiment, the second light diffusing means 41, which is different from the first light diffusing means 31, is provided within the transmission-type screen 20. The pattern of the glares formed by the first light diffusing means 31 changes the position thereof according to the change of the position of the Fresnel lens screen 30, while keeping the pattern of the glares the same. Because the second light diffusing means 41 is illuminated with the light from the first light diffusing means 31, the pattern of the glares formed by the second light diffusing means 41 changes according to the relative relationship between (i.e., the relative positions of) the second light diffusing means 41 and the first light diffusing means 31. As a result, it is possible to enable the viewer to have a perception while the light intensity is temporally averaged, without his/her eyes following the pattern of the glares.

In this situation also, the momentary coherence does not change. Thus, the glares (or the moving average of the glares caused by the change of the position) become less in terms of the average in the predetermined period of time, and the instantaneous glares are not eliminated. It means that, when the moving average changes, the way the glares are seen also changes.

Figure 3:
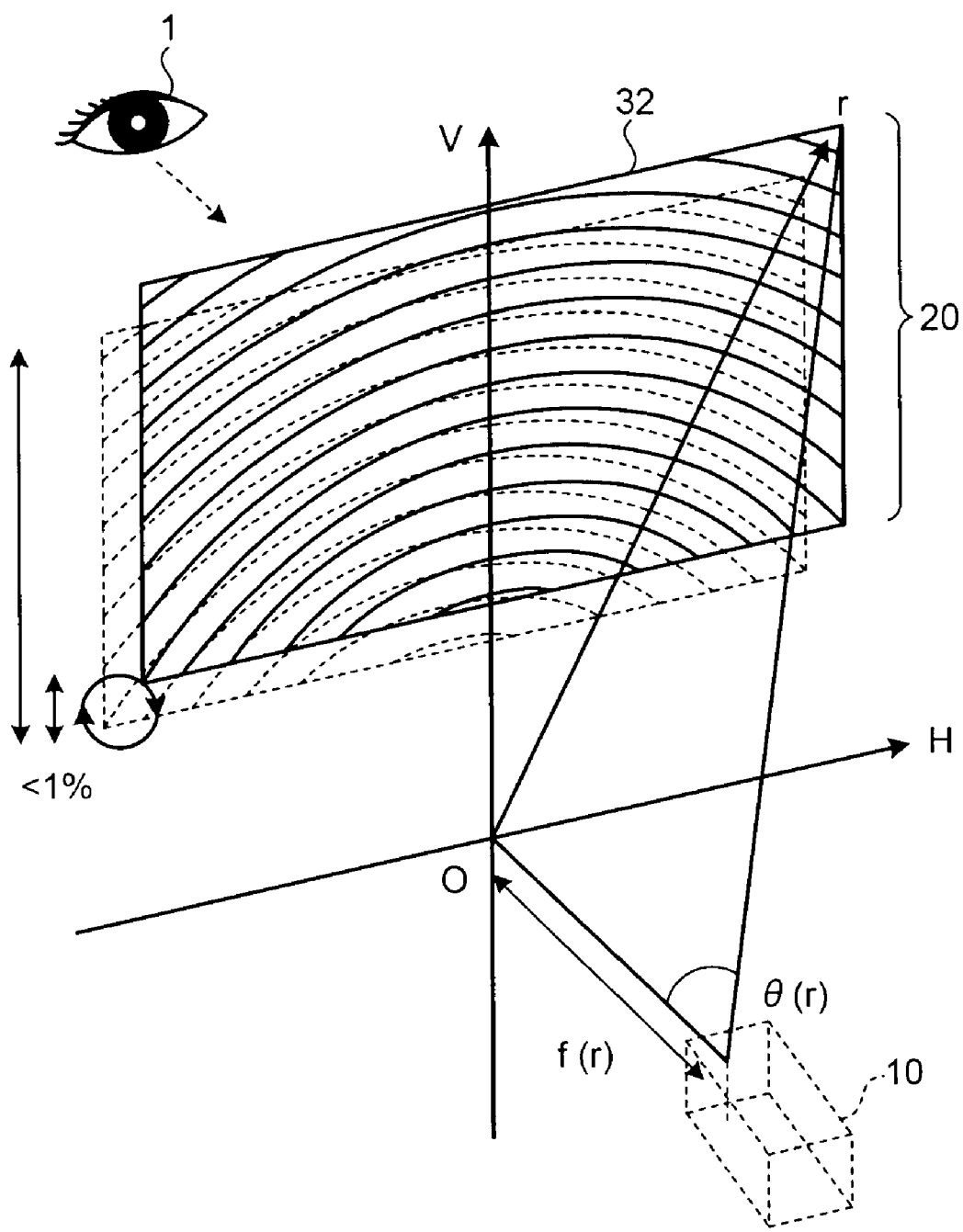
FIG. 3 is a drawing explaining changing a position of a transmission-type screen.

For this reason, it is preferable to change the position of the transmission-type screen 20 in a motion at a uniform speed (hereinafter, "uniform motion") like, for example, a uniform circular motion as shown in FIG. 3. The reason for this is that, when a limit manipulation by which the speed of the transmission-type screen 20 becomes zero is performed, the effect of the temporal (moving) average of the light intensity is lost. In actuality, even if the speed is not zero, when the moving speed of the transmission-type screen 20 changes, the effect of the temporal average also changes. Accordingly, the way the glares are seen also changes and, as a result, it becomes easier for the viewer to perceive the glares. For this reason, according to the first embodiment, the position of the transmission-type screen 20 is changed by using a uniform motion like, for example, a uniform circular motion.

Next, an example in which a positional change is actually applied to the Fresnel lens screen 30 or the image display element 40 will be explained. It is assumed that the transmission-type screen 20 that is provided for the projection-type display device 100 according to the first embodiment has a size of, for example, approximately 50 inches to 100 inches diagonally. In this situation, the sizes of the Fresnel lens screen 30 and the image display element 40 are each, for example, approximately several meters squared, although these sizes are dependent on the aspect ratio (e.g., 4:3, 16:9, or the like) of the transmission-type screen 20. For the projection-type display device 100, the transmission-type screen 20 having a large dimension as described here is moved at a speed of several hertz. The amount by which the transmission-type screen 20 is moved is, for example, approximately several millimeters (i.e., smaller than 1% of the size of the transmission-type screen 20, for example), depending on the coherence.

For commonly-used projection-type display devices, when the screen is large, even if the moving amount of the screen is relatively small with respect to the size of the screen, there is a possibility that, due to a very small distortion, warping, or positional displacement, the Fresnel lens screen may hit the lenticular screen or a housing (i.e., a housing that is positioned in the periphery of the Fresnel lens screen and the image display element) and the screen may be damaged. In addition, the Fresnel lens screen and the lenticular screen can be deformed by heat or moisture. The Fresnel lens screen and the lenticular screen each also have an initial warp.

For this reason, according to the first embodiment, the gap between the Fresnel lens screen 30 and the image display element 40 is equal to or larger than a predetermined value. For example, the gap between the Fresnel lens screen 30 and the image display element 40 is approximately 2 millimeters to 10 millimeters.

When the gap between the Fresnel lens screen 30 and the image display element 40 is too large, the image is affected with a tendency of becoming blurred. While the image becomes blurred, the complex degree of coherence is affected with a tendency of becoming lower. As a result, the instantaneous coherence also becomes lower, so that the glares also decrease.

According to the first embodiment, because the Fresnel lens screen 30 and the image display element 40 are moved relatively, it is possible to reduce the glares with the temporal average (i.e., the moving average) caused by the oscillation. Accordingly, because there is no need to keep the first light diffusing means 31 and the second light diffusing means 41 apart farther than necessary, the blurring of the image becomes less. In other words, by positioning the first light diffusing means 31 and the second light diffusing means 41 so as to be as close to each other as possible, it is possible to improve a perceived level of image resolution.

A conventional exiting-side Fresnel lens is structured so that it is not possible to provide a light diffusing unit on the light-exiting-surface side. To cope with this situation, according to the first embodiment, the entering-side Fresnel lens 32 having prisms formed on the light-entering-surface side is used in the Fresnel lens screen 30, so that it is possible to provide the first light diffusing means 31 on the light-exiting-surface side of the Fresnel lens screen 30.

Figure 4:
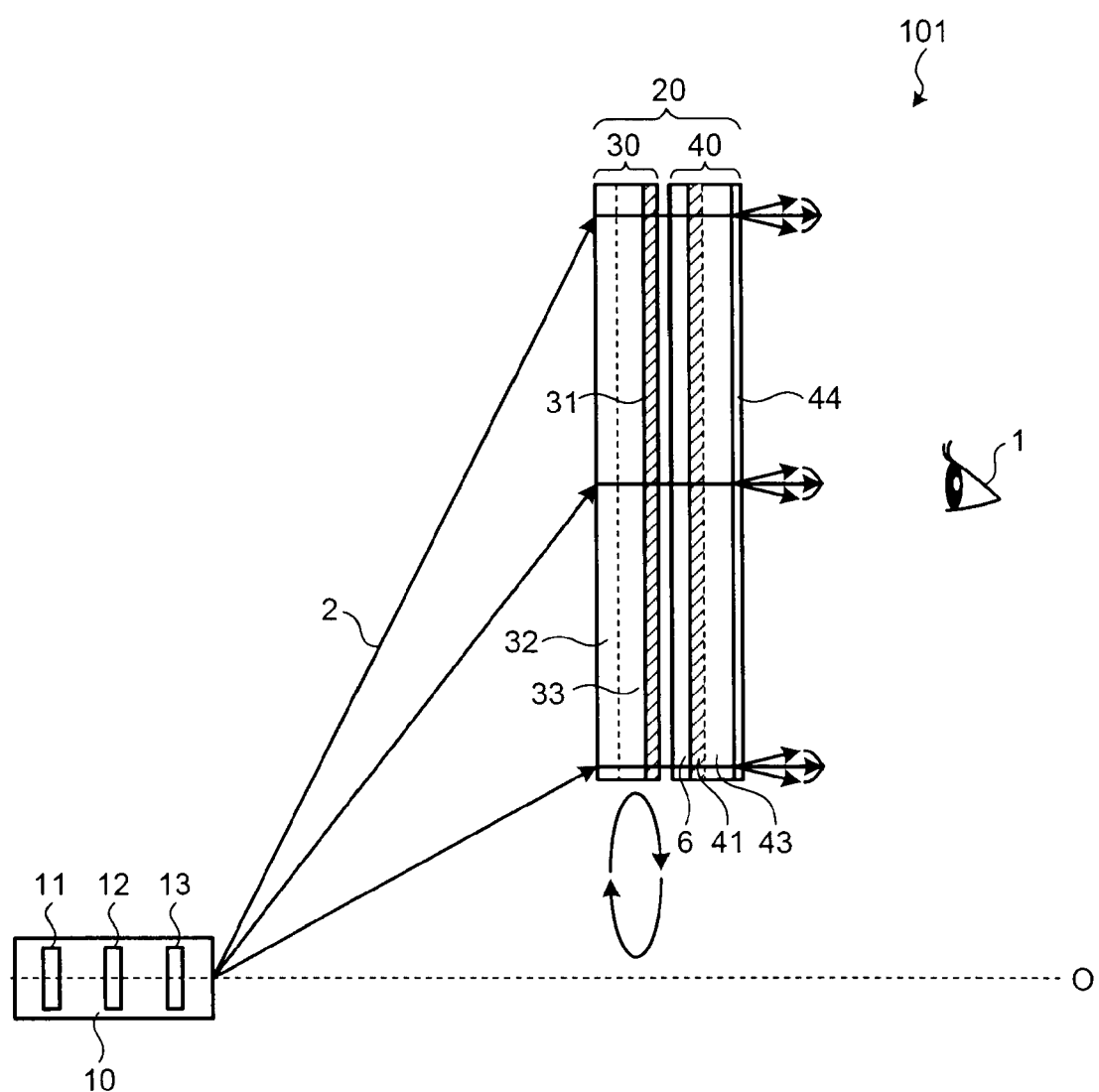
FIG. 4 is a drawing illustrating a configuration of a projection-type display device in the case where a first light diffusing unit is provided on a light-exiting-surface side of a Fresnel lens screen.

FIG. 4 is a drawing illustrating a configuration of a projection-type display device in the case where the first light diffusing unit is provided on the light-exiting-surface side of the Fresnel lens screen. A projection-type display device 101 shown in FIG. 4 is different from the projection-type display device 100 shown in FIG. 1 in terms of the structure of the Fresnel lens screen 30. In the Fresnel lens screen 30 included in the projection-type display device 101, the first light diffusing means 31 is provided on the light-exiting-surface side of the Fresnel lens screen 30. As a result, the distance between the first light diffusing means 31 and the second light diffusing means 41 becomes shorter. Consequently, it is possible to improve a perceived level of image resolution.

Rear-surface projection-type display devices such as rear projectors have conventionally been constructed such that the optical axis of the projection optical system substantially coincides with the center of the transmission-type screen. Thus, to keep the dimension of projection-type display devices in the depth direction smaller or to keep projection-type display devices compact, the light flux from the projector is inflected by using a reflection mirror. Further, as a method for making projection-type display devices even thinner, a method has been known by which the light flux from the projector is projected onto a transmission-type screen at a steep angle diagonally.

For example, when a laser light source having a high degree of coherence is used as an illumination light source, because the light is emitted from the laser light source at a small divergent angle from a small area, an advantage is achieved where it is possible to keep compact the illumination optical system and the projection optical system provided in the projector. When the illumination optical system and the projection optical system provided in the projector are compact, it becomes easier to configure the entire projection-type display device so as to be thin or compact.

Figure 5:
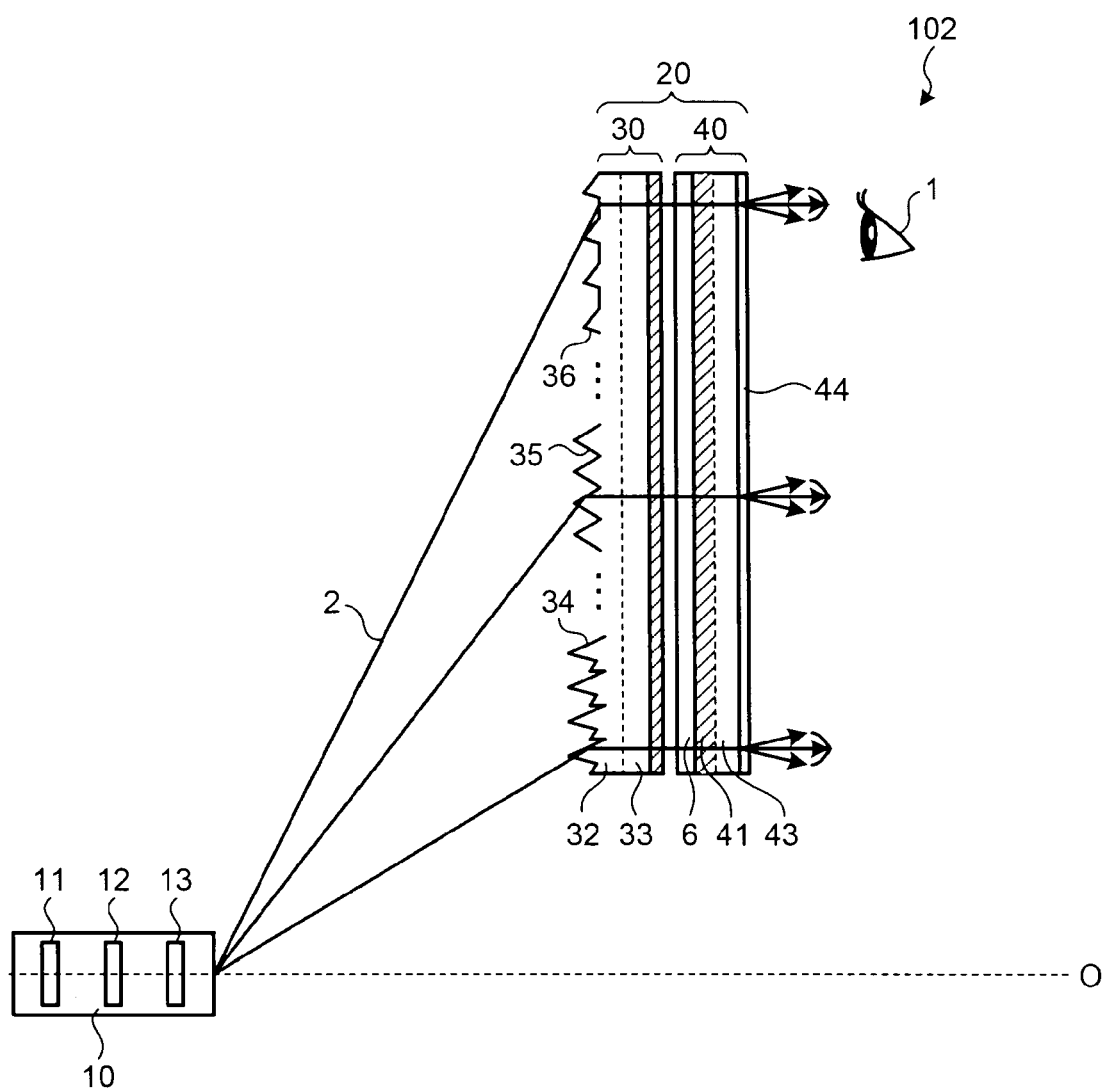
FIG. 5 is a drawing illustrating a configuration of a projection-type display device in the case where a light flux from a projector is projected onto a transmission-type screen at a steep angle.

Thus, according to the first embodiment, an arrangement is acceptable in which the light flux from the projector 10 is projected onto the transmission-type screen 20 at a steep angle. FIG. 5 is a drawing illustrating a configuration of a projection-type display device in the case where a light flux from the projector is projected onto the transmission-type screen at a steep angle. A projection-type display device 102 shown in FIG. 5 is constructed such that the light flux from the projector 10 is projected onto the transmission-type screen 20 at a steeper angle than in a conventional projection-type display device in which the center of the transmission-type screen coincides with the optical axis of the projection optical system.

It is an object of the projection-type display device 100 according to the first embodiment to reduce the glares that are caused, for example, when the projection magnification is large, when the light emitter is small, or when the light emitter is an optical system having a high degree of coherence such as one with a line spectrum. Because a laser light source having a high degree of coherence, for example, emits light at a small divergent angle from a small area, a light source having a high degree of coherence is suitable for the method by which the light is projected onto the transmission-type screen 20 at a steep angle diagonally.

For this reason, according to the first embodiment, the method by which the image light is projected onto the transmission-type screen 20 at a steep angle diagonally is used in combination with a light source having a high degree of coherence. With this combination, it is possible to provide, unlike in the conventional example, various types of lenses on the light-entering-surface side of the Fresnel lens screen 30. As a result, it is possible position the light diffusing units closer to each other than in the conventional example.

Next, with regard to the Fresnel lens screen 30, the entering-side Fresnel lens 32 having prisms formed on the light-entering-surface side will be explained. As shown in FIG. 5, the entering-side Fresnel lens 32 may be, for example, a combination-type Fresnel lens 34, a light-entering-surface-side total-reflection Fresnel lens (hereinafter, an "entering-side total-reflection Fresnel lens), or a light-entering-surface-side partially-total-reflection Fresnel lens (hereinafter, an "entering-side partially-total-reflection Fresnel lens) 36.

In the example shown in FIG. 5, the combination-type Fresnel lens 34, the entering-side total-reflection Fresnel lens 35, and the entering-side partially-total-reflection Fresnel lens 36 are all indicated in the single entering-side Fresnel lens 32. However, it is possible to select one or more of the Fresnel lenses as necessary according to the design of the projector 10. Accordingly, there is no need to use the three types of Fresnel lenses in a combined manner within the single transmission-type screen 20. In the following sections, a detailed configuration of the entering-side Fresnel lens 32 having the prisms formed on the light-entering-surface side will be explained.

Figure 6:
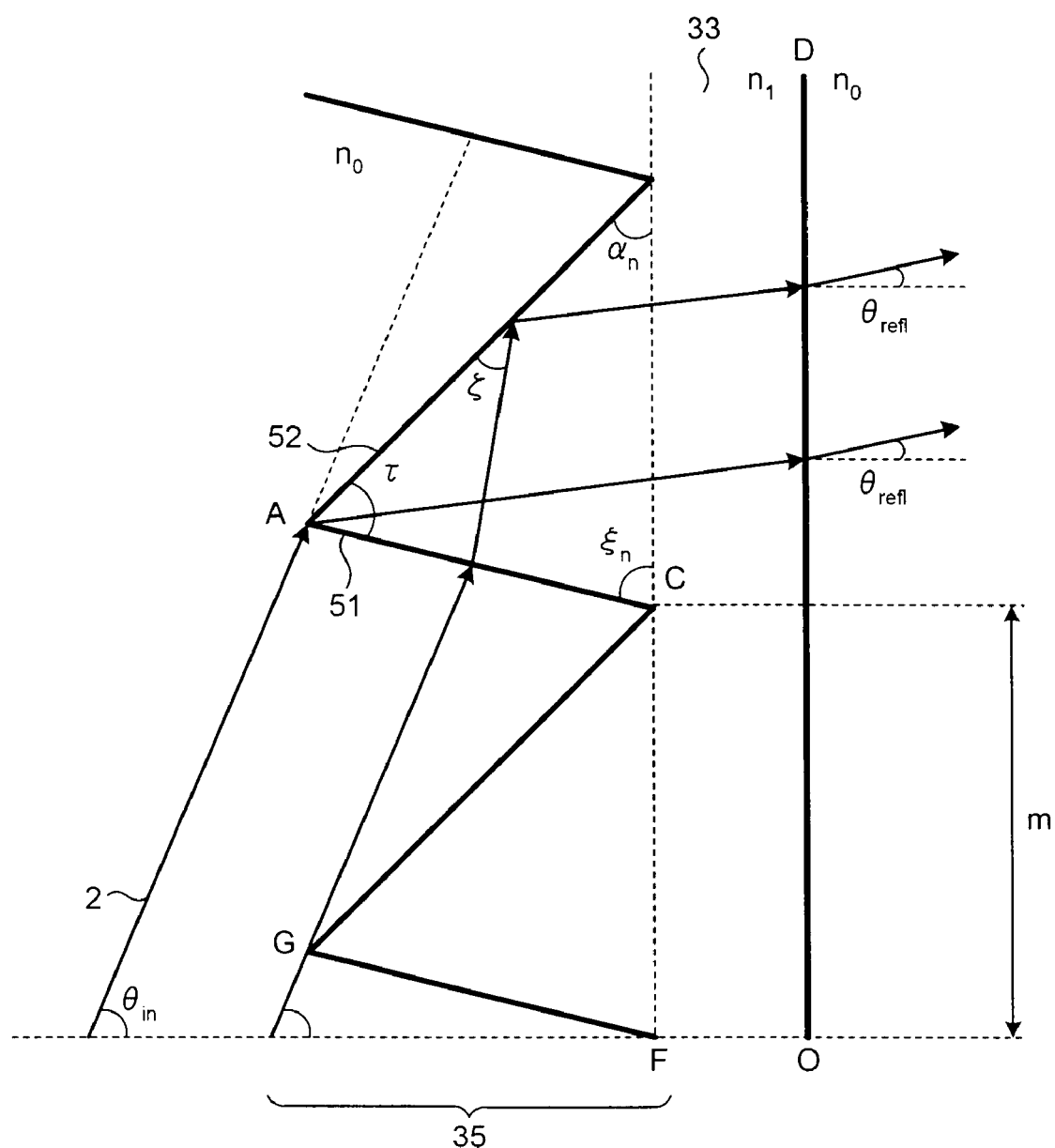
FIG. 6 is a drawing illustrating a cross-sectional configuration of a light-entering-surface-side total-reflection Fresnel lens (hereinafter, an "entering-side total-reflection Fresnel lens).

FIG. 6 is a drawing illustrating a cross-sectional configuration of an entering-side total-reflection Fresnel lens. The entering-side total-reflection Fresnel lens 35 is a Fresnel lens that totally reflects the light flux of image light 2 that has entered the prisms on the opposite surfaces (i.e., the rear surfaces of the light entering surfaces) and deflects the light toward the light exiting surface. The entering-side total-reflection Fresnel lens 35 forms total-reflection prisms (i.e., Fresnel prisms) by providing a plurality of refraction surfaces 51 that cause the light flux of the image light 2 radiated from the projector 10 to be refracted and a plurality of reflection surfaces 52 (i.e., the rear surfaces of the light entering surfaces) that cause the light flux refracted by the refraction surfaces 51 to be totally reflected toward the first substrate 33 side. With this arrangement, when the entering-side total-reflection Fresnel lens 35 is being used, the light flux of the image light 2 is refracted by the first refraction surfaces 51 into a predetermined direction, and also, the light flux that has been refracted is totally reflected by the reflection surfaces 52 toward the first substrate 33 side.

Figure 7:
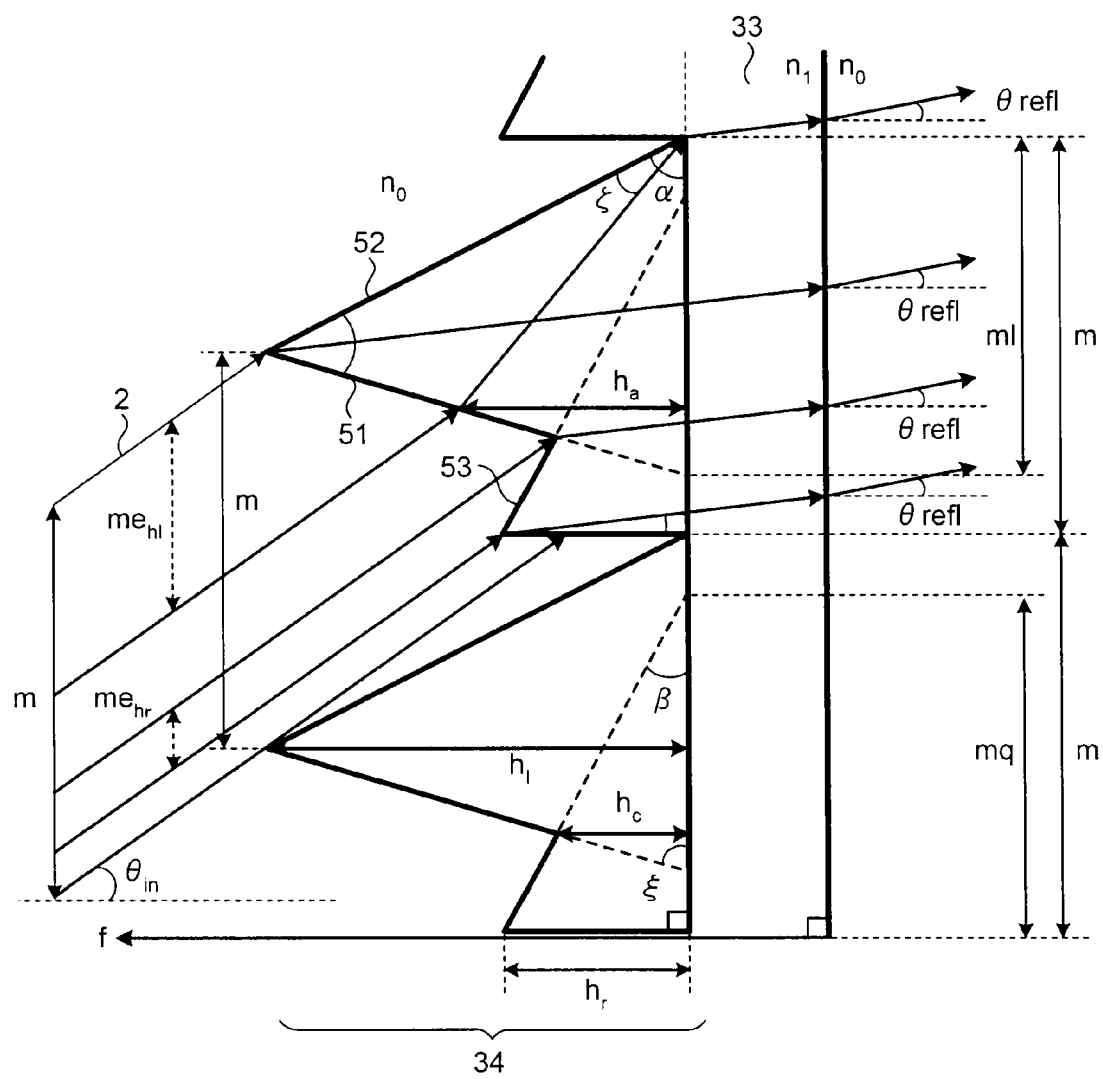
FIG. 7 is a drawing illustrating a cross-sectional configuration of a combination-type Fresnel lens.

FIG. 7 is a drawing illustrating a cross-sectional configuration of a combination-type Fresnel lens. The combination-type Fresnel lens 34 is a Fresnel lens (an entering-side total-reflection/refraction combination-type Fresnel lens) in which, within each single prism, a refraction-type Fresnel lens that causes only refracted light out of the light flux having entered the prism to be deflected toward the light exiting surface is combined with the entering-side total-reflection Fresnel lens 35.

The combination-type Fresnel lens 34 has, within a pitch, a total reflection prism that is made up of the refraction surface 51 and the reflection surface 52 as well as a second refraction surface 53 (i.e., a refraction prism) that causes the light flux of the image light 2 radiated from the projector 10 to be refracted. With this arrangement, when the combination-type Fresnel lens 34 is being used, the light flux of the image light 2 is refracted by the first refraction surfaces 51 into a predetermined direction, and also, the light flux that has been refracted is totally reflected by the reflection surfaces 52 toward the first substrate 33 side. Further, such a part of the light flux of the image light 2 that has not entered the refraction surfaces 51 are refracted by the second refraction surfaces 53 toward the first substrate 33 side.

Figure 8:
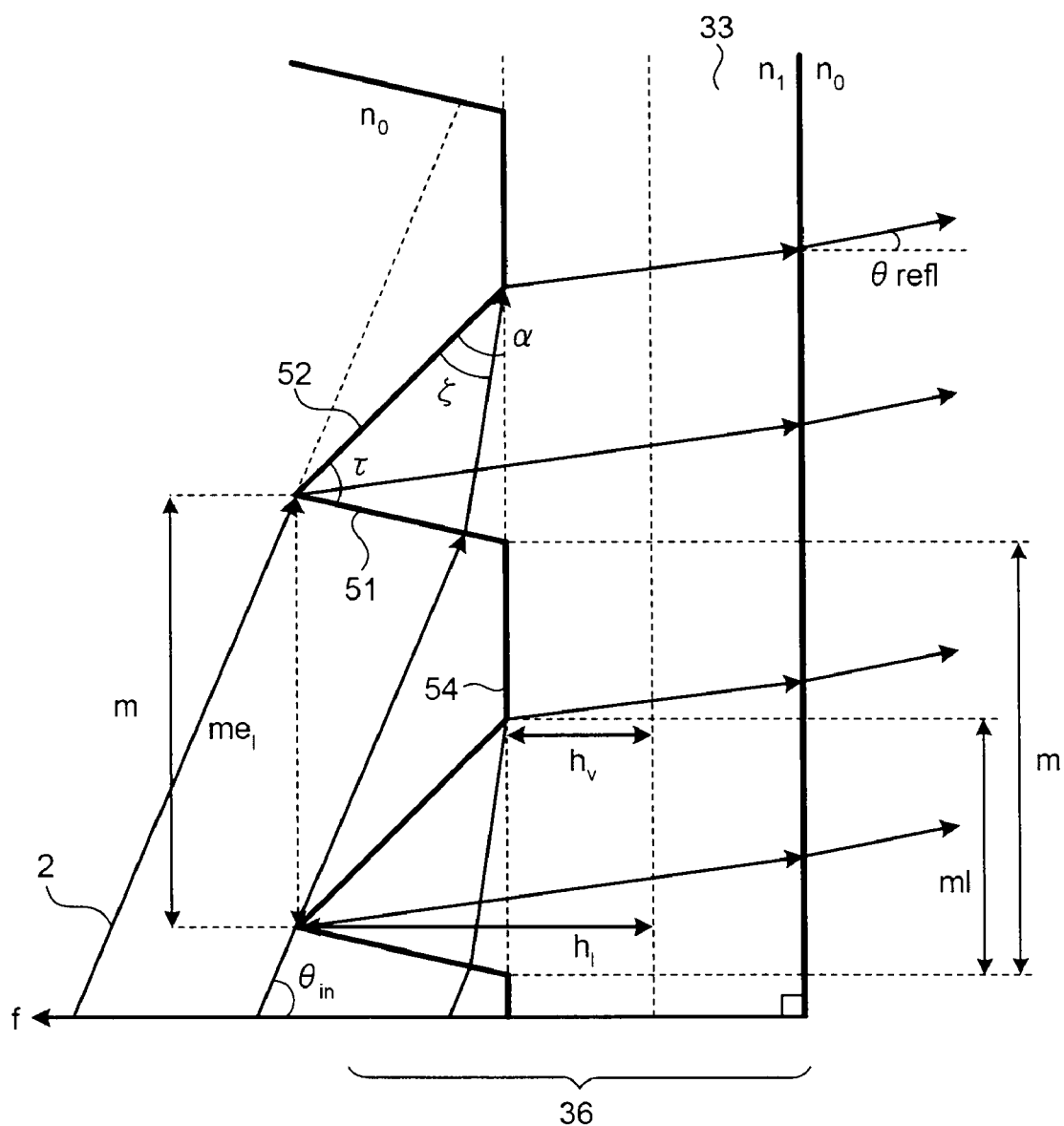
FIG. 8 is a drawing illustrating a cross-sectional configuration of a light-entering-surface-side partially-total-reflection Fresnel lens (hereinafter, "an entering-side partially-total-reflection Fresnel lens).

FIG. 8 is a drawing illustrating a cross-sectional configuration of an entering-side partially-total-reflection Fresnel lens. The entering-side partially-total-reflection Fresnel lens 36 is a Fresnel lens in which valley portions (i.e., dented portions) of the entering-side total-reflection Fresnel lens 35 is made parallel to the light exiting surface (i.e., a main surface of the first substrate 33). When the entering-side partially-total-reflection Fresnel lens 36 is being used, the light flux of the image light 2 does not enter through non-light-entering surfaces 54 (i.e., the dented portions).

Figure 9:
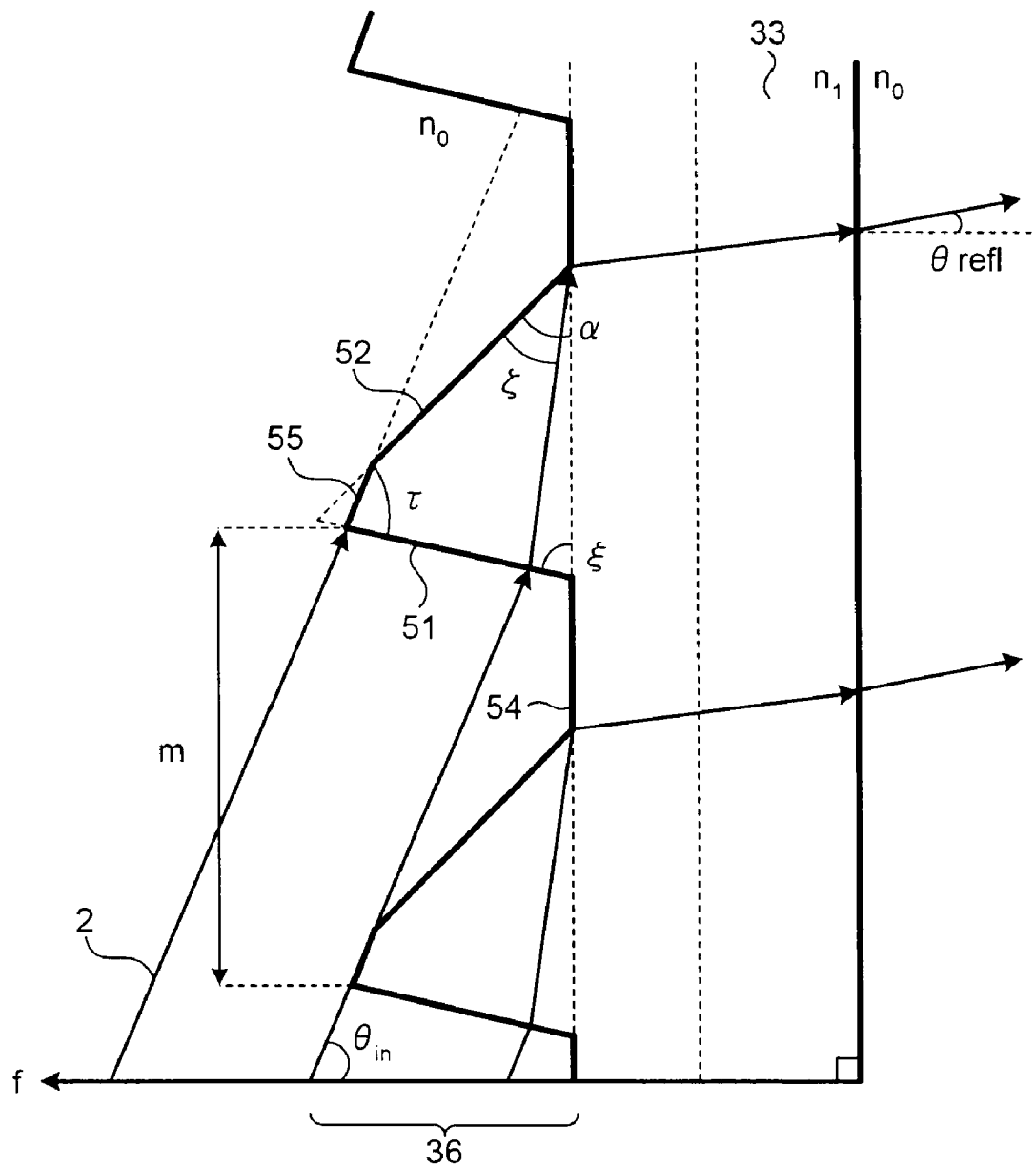
FIG. 9 is a drawing illustrating a cross-sectional configuration of an entering-side partially-total-reflection Fresnel lens in a case where tip portions of prisms have been removed.

Alternatively, the entering-side partially-total-reflection Fresnel lens 36 may be formed such that a part of each of the tips of the prisms is removed so as to be substantially parallel to the entering light beams. FIG. 9 is a drawing illustrating a cross-sectional configuration of an entering-side partially-total-reflection Fresnel lens in the case where tip portions of prisms have been removed. In the entering-side partially-total-reflection Fresnel lens 36 shown in FIG. 9, the tip portions of the prisms are taken off so as to form in each of the tip portions of the prisms a tip-removed surface (i.e., an entering-light-parallel-surface) 55 that is substantially parallel to the entering light beams.

The combination-type Fresnel lens 34, the entering-side total-reflection Fresnel lens 35, and/or the entering-side partially-total-reflection Fresnel lens 36 used in the entering-side Fresnel lens 32 are all configured so that the image is reversed in the up-and-down direction within one pitch of the Fresnel lens. Thus, a pitch m of the entering-side Fresnel lens 32 is an appropriate length according to the pixels to be projected. More specifically, the pitch m is at least sufficiently finer than each of the pixels to be projected onto the transmission-type screen 20. (Preferably, at least as small as one fifth of each of the pixels to be projected; and more preferably, smaller than one tenth of each of the pixels to be projected).

As explained above, the projection-type display device 100 includes the entering-side Fresnel lens 32, which is different from the conventional exiting-side Fresnel lens. Thus, it is possible to inflect the direction of the light by a large amount by utilizing the total reflection phenomenon within the prisms. With this arrangement, even if the angle of incidence from the projector 10 into the entering-side Fresnel lens 32 is large, it is possible to guide the light flux from the projector 10 to the image display element 40.

In addition, according to the first embodiment, the center of the concentric circle of the entering-side Fresnel lens 32, which is provided in the manner of a concentric circle, is positioned on the outside of the surface (i.e., the screen surface) of the transmission-type screen 20, as shown in FIG. 3. In other words, the center of the arc of the entering-side Fresnel lens 32 is positioned on the outside of the screen. In addition, the projector 10 is provided within the projection-type display device 100 in such a manner that the center of the arc substantially coincides with the optical axis of the projection optical system 13. By using the center of the arc and the optical axis of the projection optical system 13 as reference positions during the positioning process in this manner, it is possible to make the assembling and adjusting processes simple. In FIGS. 1, 4, and the like, the optical axis of the projection optical system 13 is indicated with a broken line extending from the projector 10 to the point of origin O. In contrast, in FIG. 3, the optical axis of the projection optical system 13 is indicated with a solid line extending from the projector 10 to the point of origin O.

Figure 10:
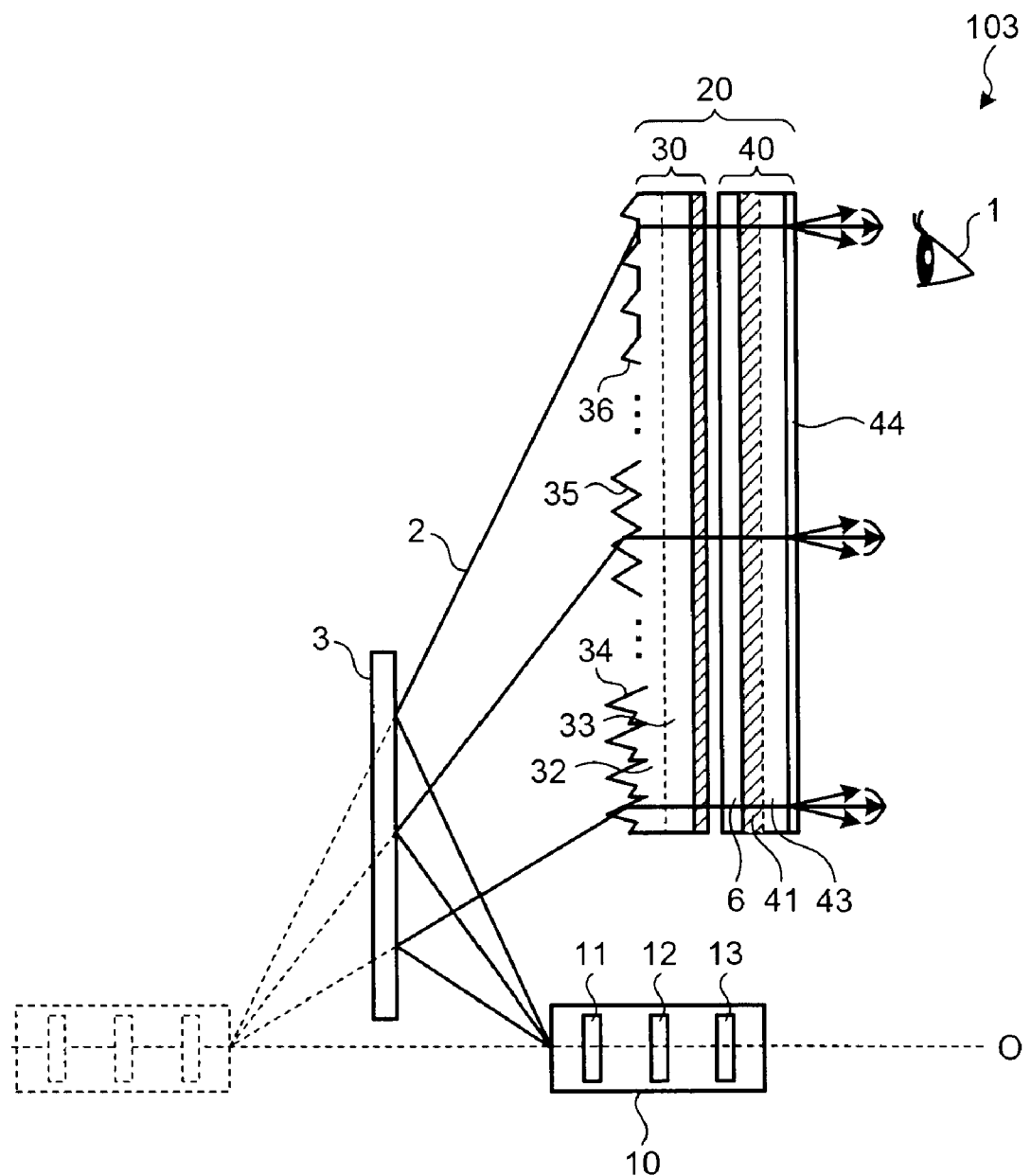
FIG. 10 is a first drawing illustrating an exemplary configuration of a projection-type display device in the case where a light flux is guided onto a transmission-type screen via a reflection mirror.
Figure 11:
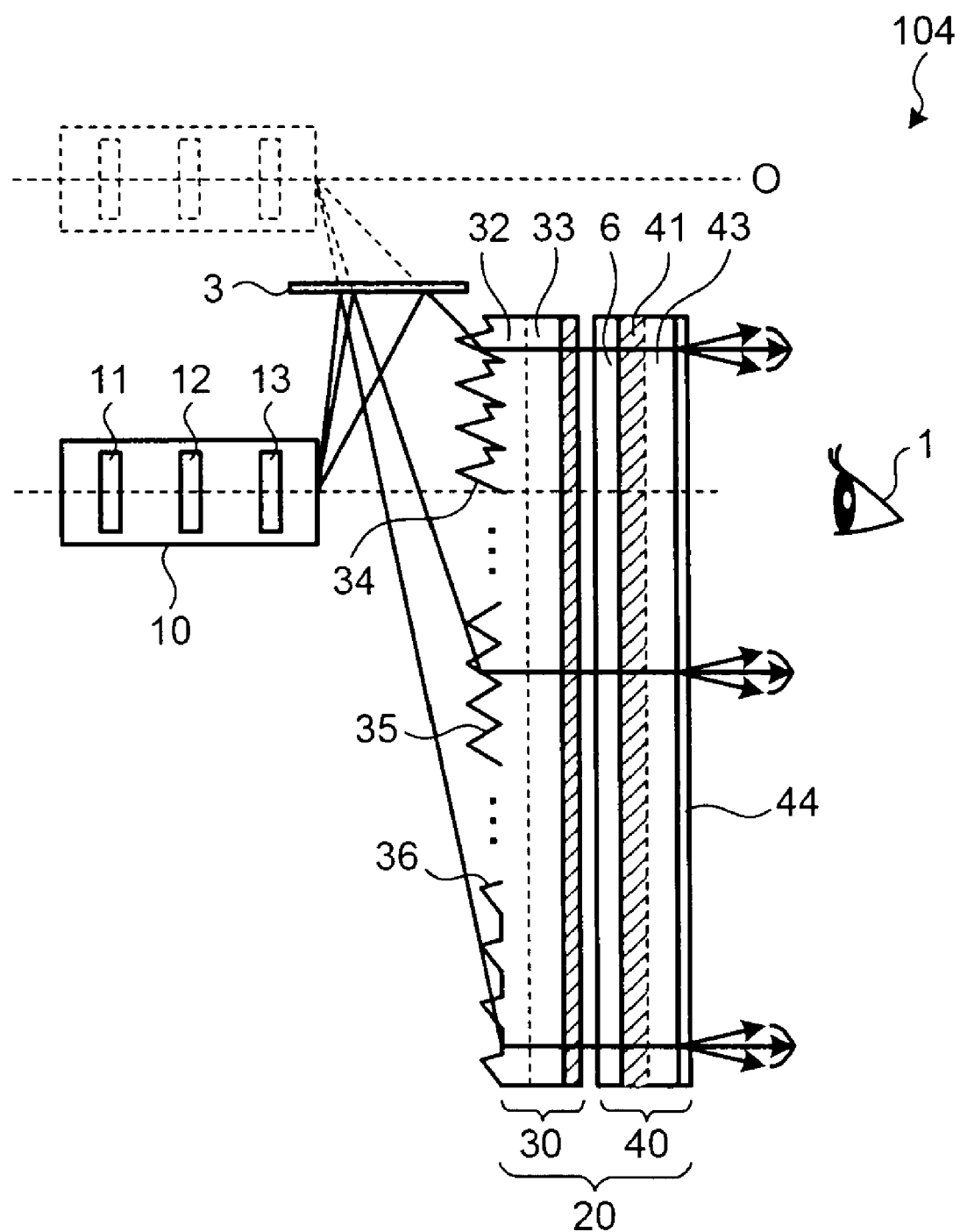
FIG. 11 is a second drawing illustrating an exemplary configuration of another projection-type display device in the case where a light flux is guided onto a transmission-type screen via a reflection mirror.
Figure 12:
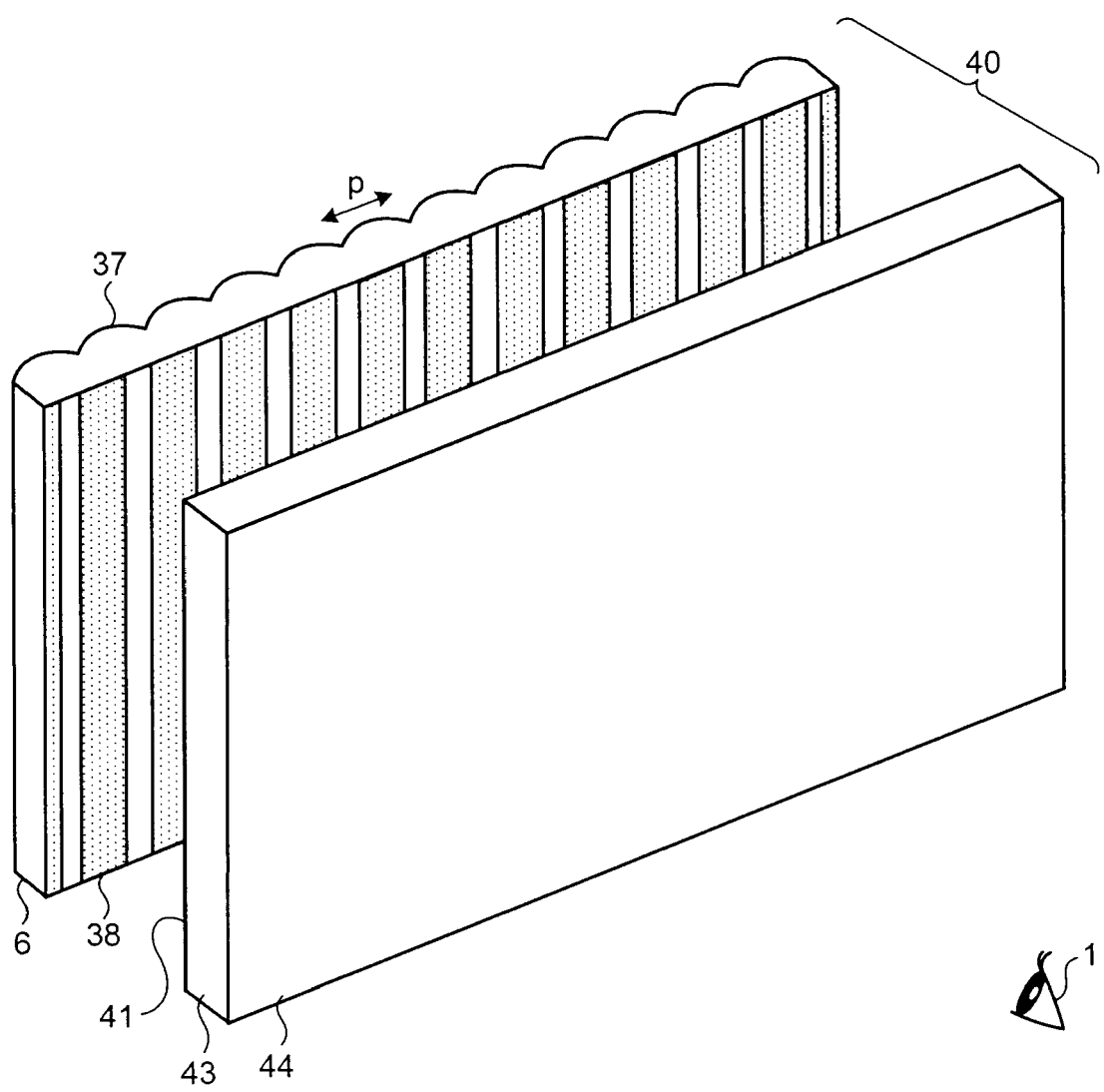
FIG. 12 is a first drawing illustrating an exemplary configuration of a lens element.

According to the first embodiment, another arrangement is acceptable in which a predetermined reflection mirror (the reflection mirror 3 described below) is provided somewhere in the middle of an optical path extending from the projector 10 to the transmission-type screen 20, so that the light flux is inflected by the reflection mirror 3. FIGS. 10 and 11 are drawings illustrating configurations of projection-type display devices in the case where a light flux is guided onto the transmission-type screen 20 via a reflection mirror.

In FIG. 10, a configuration of a projection-type display device 103 in the case where the reflection mirror 3 is positioned in a direction parallel to a main surface of the transmission-type screen 20 is shown. In FIG. 11, a configuration of a projection-type display device 104 in the case where the reflection mirror 3 is positioned in a direction vertical to a main surface of the transmission-type screen 20 is shown.

As explained above, the reflection mirror 3 is provided somewhere in the middle of the optical path extending from the projector 10 to the transmission-type screen 20, so that the light flux is inflected by the reflection mirror 3. Thus, it is possible to make the projection-type display device 100 thinner or more compact. With the projection-type display device 103 shown in FIG. 10, it is possible to make smaller the dimension in the direction that is vertical to the main surface of the transmission-type screen 20. In contrast, with the projection-type display device 104 shown in FIG. 11, it is possible to make smaller the dimension in the direction that is parallel to the main surface of the transmission-type screen 20.

The positions in which the reflection mirror 3 and the projector 10 are provided may be in any direction with respect to the transmission-type screen 20. Accordingly, the transmission-type screen 20 does not necessarily have to be in the up-and-down direction as shown in FIGS. 10 and 11.

Next, a relationship between lens apertures and blurring of images will be explained in detail. When a lens aperture (corresponding to the pupil function) is finite, the wavefront is cut out so that the spatial frequency is partially blocked. In other words, the lens functions as a low-pass filter. As a result, when a lens having a small aperture is used, the image resolving power becomes degraded. Similarly, with regard to the propagation of coherence also, when the pupil function becomes smaller, the effective source relatively becomes larger. Thus, the light becomes more incoherent, and the complex degree of coherence becomes lower. In other words, when a lens having a smaller aperture is used, the image becomes blurred because the aberration becomes larger. At the same time, because the degree of coherence becomes lower, the instantaneous glares also decrease.

While the projection-type display device 100 is being used, because an image is formed by the pixels projected onto the transmission-type screen 20, there is no structure in the image that is finer than the pixels. Thus, by forming the transmission-type screen 20 with a lens having a smaller size than at least the size of each of the pixels, it is possible to sufficiently ignore the blurring of the image. For these reasons, according to the first embodiment, the lens element 6 having a pitch (i.e., a pitch P described below) that is smaller than each of the projected pixels is used. With this arrangement, it is possible to improve the perceived level of image resolution and to obtain the transmission-type screen 20 that are able to reduce the glares.

For example, in the case where an average viewer (having 10/10 vision) views an image from a commonly-used viewing distance (e.g., a distance that is three times as long as the height of the transmission-type screen 20), the resolvable limit for the viewer is approximately 1 millimeter. For example, when the width of a main surface of the screen is assumed to be 1 meter, and the number of pixels in the width direction is assumed to be 1000, the size of a projected pixel in the width direction is exactly 1 millimeter per pixel (i.e., 0.1% of the screen). Consequently, in this situation, it is appropriate to set the pitch P of the lens element 6 so as to satisfy P<1 millimeter.

In the following sections, exemplary configurations of the lens element 6 will be explained. FIGS. 12 to 15 are drawings illustrating configurations of the lens element. In the lens element 6 shown in FIG. 12, cylindrical lenses 37 are provided on the light-entering-surface side in such a manner that the cylindrical lenses 37 are positioned adjacent to each other while extending in the height direction of the lens element 6. Also, light absorbing portions 38 are formed in the manner of stripes in the positions corresponding to non-light-collecting portions of the cylindrical lenses 37 (on the second substrate 43 side).

Figure 13:
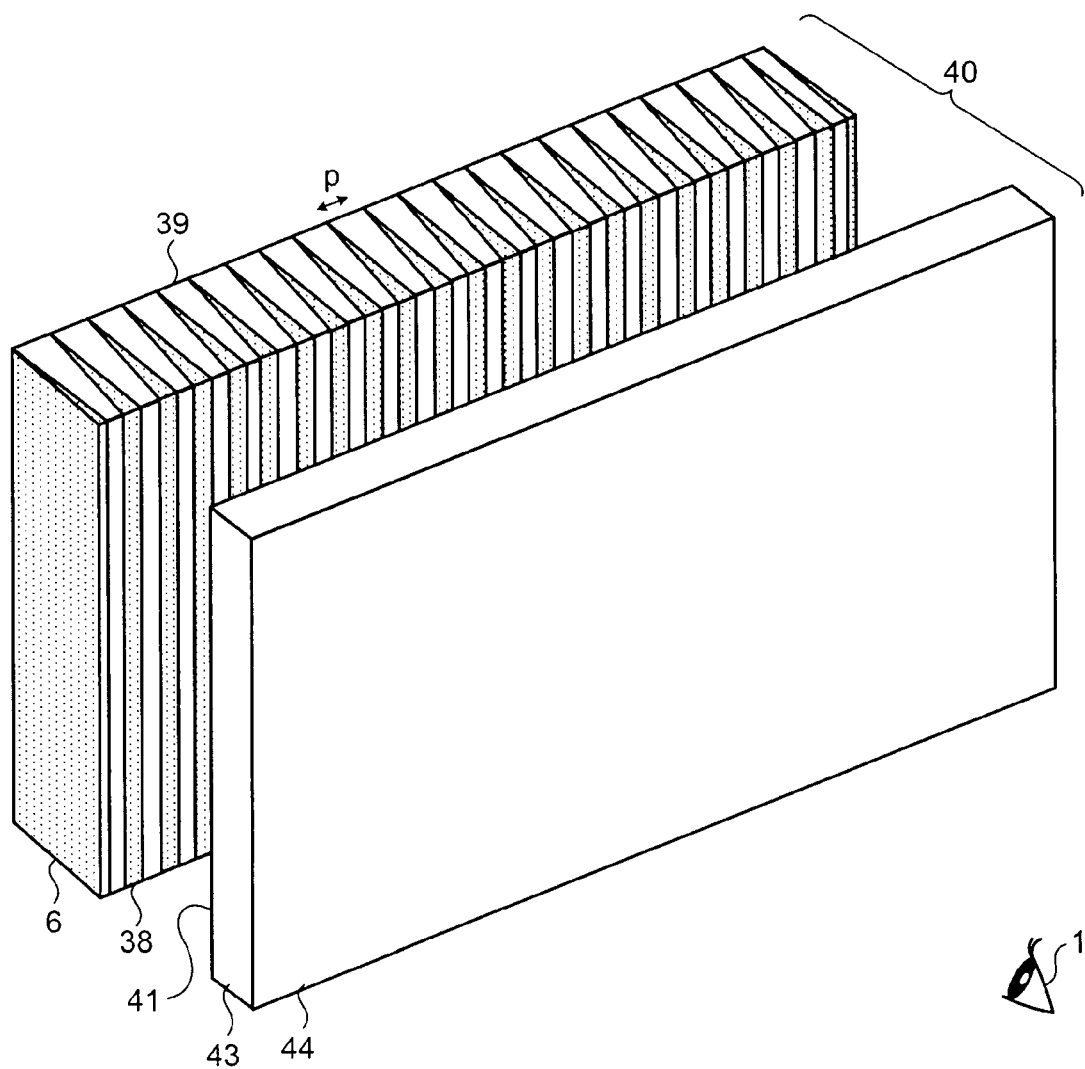
FIG. 13 is a second drawing illustrating another exemplary configuration of the lens element.

As another example, the lens element 6 shown in FIG. 13 has trapezoidal lenses 39 on the light-entering-surface side and light absorbing portions 38 on the light-exiting-surface side. The trapezoidal lenses 39 include a plurality of unit lenses each having a trapezoidal columnar shape. The trapezoidal unit lenses are positioned next to one another (i.e., adjacent to one another) so that the lateral faces corresponding to the lower sides of the trapezoids are positioned next to one another on the light-entering-surface side, while the lateral faces corresponding to the upper sides of the trapezoids are positioned next to one another on the light-exiting-surface side. The lateral faces of the trapezoidal lenses 39 corresponding to the lower sides of the trapezoids represent a total reflection portion that totally reflects light. The trapezoidal lenses 39 causes a part of the light beams that have entered from the light-entering-surface side to be totally reflected on the total reflection portion, before causing the totally-reflected light beams to exit from the light-exiting-surface side.

The light absorbing portions 38 are positioned in the valley portions between the unit lenses serving as the trapezoidal lenses 39. When the lens element 6 is viewed from the light-exiting-surface side, the light absorbing portions 38 and the lateral faces of the trapezoidal lenses 39 corresponding to the upper sides of the trapezoids form stripes.

Figure 14:
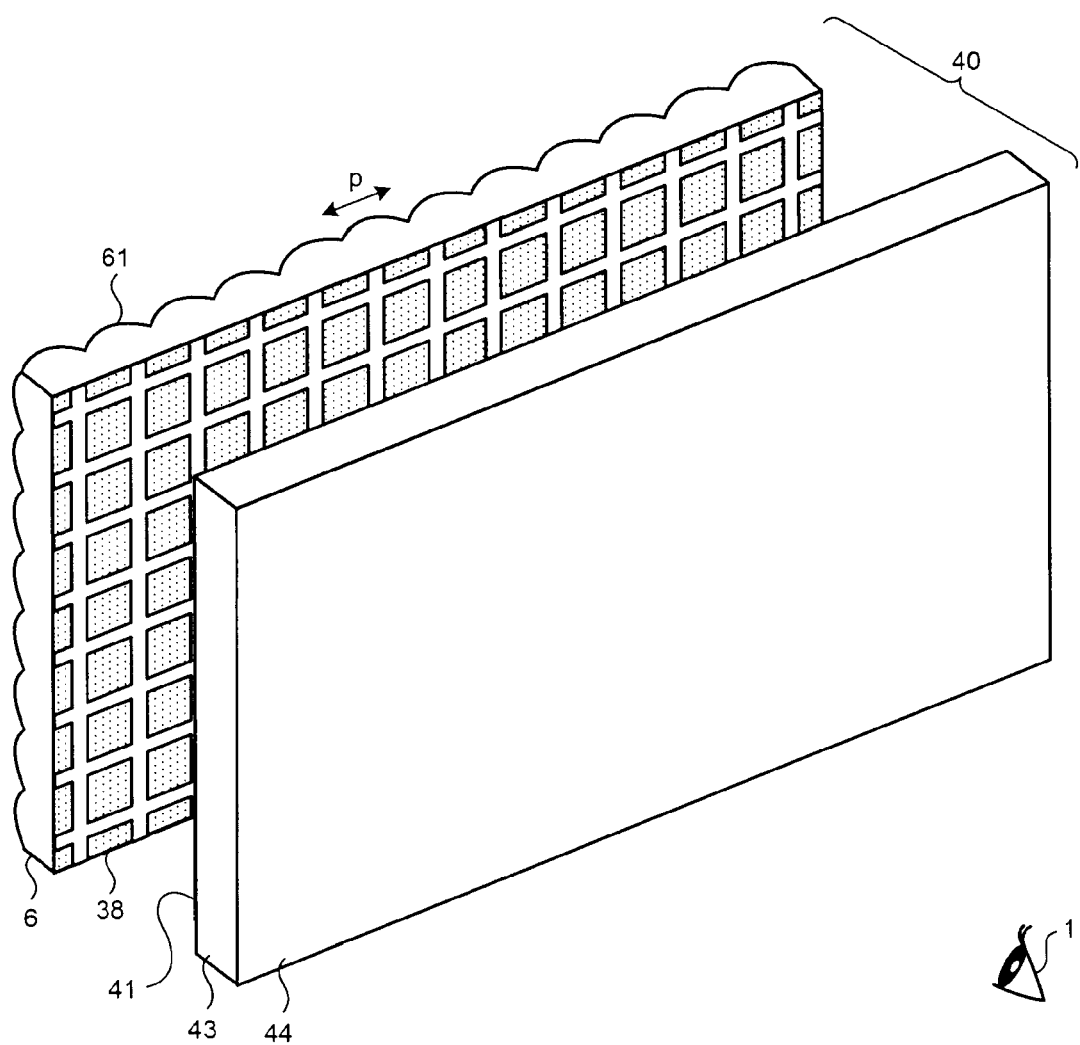
FIG. 14 is a third drawing illustrating yet another exemplary configuration of the lens element.

As yet another example, in the lens element 6 shown in FIG. 14, cylindrical lenses 61 are provided on the light-entering-surface side in such a manner that the cylindrical lenses 61 are positioned adjacent to each other in a matrix configuration along the height direction and the width direction of the lens element 6. Also, the light absorbing portions 38 are formed in the positions corresponding to non-light-collecting portions (i.e., the rear-surface side of the convex portions) of the cylindrical lenses 61 that are positioned along the height direction and the width direction. With this arrangement, the light absorbing portions 38 has a configuration in which rectangles are arranged in a matrix configuration. In other words, the rectangles are isolated from one another in the manner of islands by the grid lines extending along the height direction and the width direction.

Figure 15:
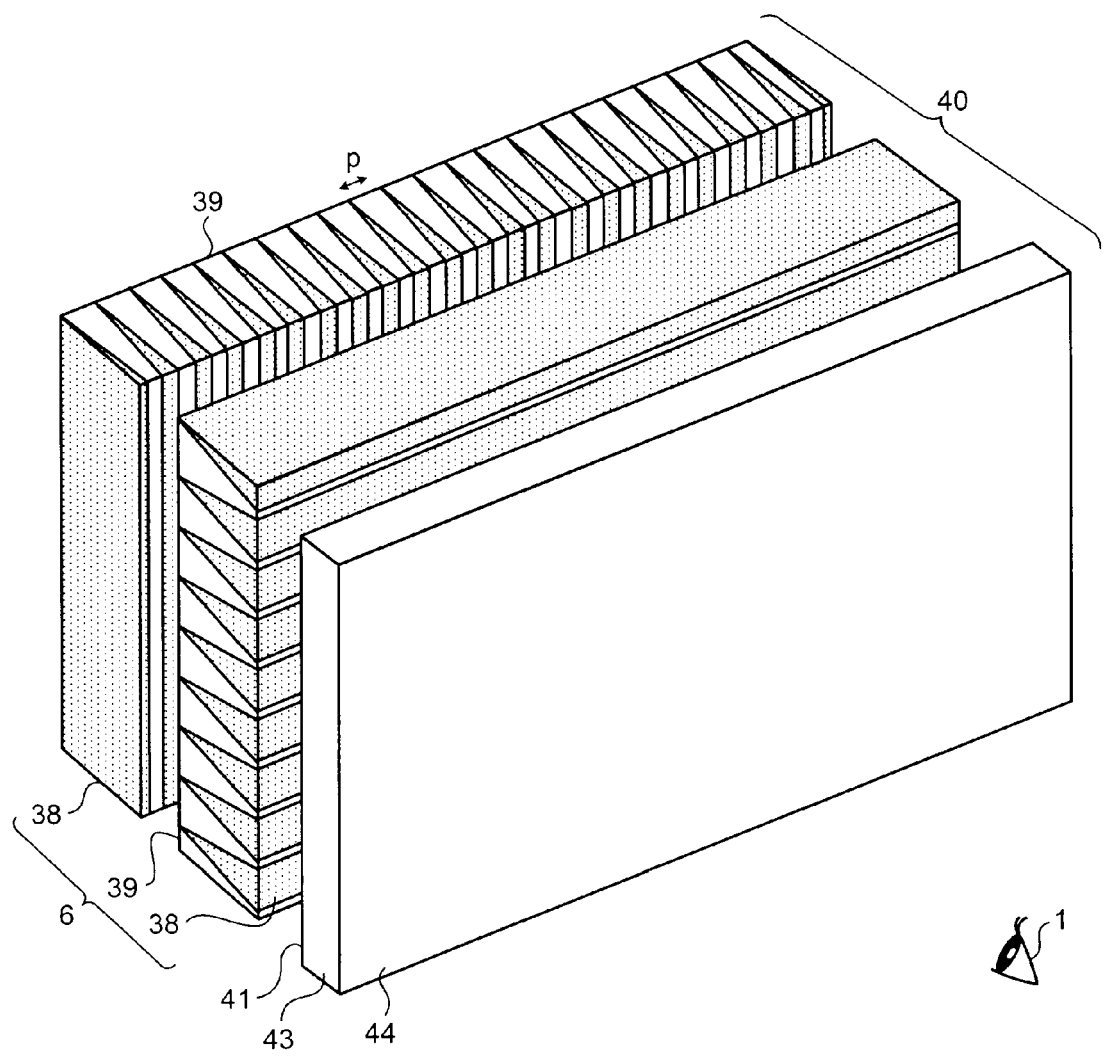
FIG. 15 is a fourth drawing illustrating yet another exemplary configuration of the lens element.

As yet another example, the lens element 6 shown in FIG. 15 is obtained by stacking two lens elements each of which is the lens element 6 shown in FIG. 13 on the light-entering-surface side, so that the main surfaces thereof overlap each other. The unit lenses included in one of the lens elements 6 are arranged along the width direction of the lens element 6, while the unit lenses included in the other lens element 6 are arranged along the height direction of the lens element 6, so that the unit lenses in the one of the lens elements 6 extend orthogonally to the unit lenses in the other lens element 6. It should be noted that it does not matter which one of the two lens elements 6 (i.e., the lens element 6 in which the unit lenses are arranged along the height direction and the lens element 6 in which the unit lenses are arranged along the width direction) is provided on the light-entering-surface side.

In addition, an arrangement is acceptable in which, for example, an antireflection layer that reduces reflection of light is formed as the surface treated layer 44 on the viewer-side outmost surface of the image display element 40 including any of the lens elements 6 described above. With this arrangement, the image display element 40 is able to reduce influence of ambient light.

Further, yet another arrangement is acceptable in which one or more of the following are provided on the viewer-side outmost surface of the image display element 40: an antiglare layer for preventing glares in the vision; an antistatic layer for preventing adhesion of dust caused by static electricity; and a hard coat layer for protecting the surface. Furthermore, yet another arrangement is also acceptable in which a medium having self-lubricating properties or a resilient member such as a gel-like medium is provided between the Fresnel lens screen 30 and the image display element 40.

In FIG. 1 or the like illustrating the first embodiment, the first light diffusing means 31 and the first substrate 33 are indicated as separate members; however, another arrangement is acceptable in which the first substrate 33 includes the first light diffusing means 31. In other words, the first substrate 33 and the first light diffusing means 31 may be integrally manufactured. For example, the first substrate 33 and the first light diffusing means 31 may be manufactured by using the same method as the method for manufacturing the second substrate 43 and the second light diffusing means 41.

In FIG. 4 or the like illustrating the first embodiment, the border between the entering-side Fresnel lens 32 and the first substrate 33 is indicated with a broken line; however, the entering-side Fresnel lens 32 and the first substrate 33 may be produced as separate members or may be integrally manufactured. For example, the entering-side Fresnel lens 32 made of a light-curing resin may be pasted onto the first substrate 33. Alternatively, a main surface of the first substrate 33 may be pressed against a mold, so that the surface of the first substrate 33 is shaped so as to have the form of the entering-side Fresnel lens 32.

Further, it is acceptable to configure the projection-type display device 100 so that the diffusing capabilities of the first light diffusing means 31 and the second light diffusing means 41 are distributed in such a manner that the first light diffusing means 31 and the second light diffusing means 41 each have a predetermined level of diffusing capability. Because the image becomes blurred while the light propagates from the first light diffusing means 31 to the second light diffusing means 41, it may be a good idea to, for example, configure the diffusing capability of the first light diffusing means 31 so as to be at a low level and configure the diffusing capability of the second light diffusing means 41 so as to be at a high level.

In the case where the screen is configured to reduce the glares by changing the relative position between the two light diffusing layers, it is necessary to give a diffusing capability of a predetermined level or higher to the oscillating one of the light diffusing layers. The reason is that, if a lens or a mirror having no diffusing capability is used, for example, the light would propagate without disturbance of the wavefront. As a result, no glare pattern would be formed, and thus no moving average would be achieved.

In the case where the diffusing capabilities of the light diffusing layers are expressed by using degrees of haze, haze may be applied to the oscillating one of the light diffusing layers at a percentage of approximately 30% to 60%, while haze may be applied to the other non-oscillating one of the light diffusing layers at a percentage of approximately 80% to 90%. For example, when the first light diffusing means 31 is the oscillating one of the light diffusing layers, haze is applied to the first light diffusing means 31 at a percentage of 30% to 60%, while haze is applied to the second light diffusing means 41 at a percentage of 80% to 90%. Alternatively, when the second light diffusing means 41 is the oscillating one of the light diffusing layers, haze is applied to the second light diffusing means 41 at a percentage of 30% to 60%, while haze is applied to the first light diffusing means 31 at a percentage of 80% to 90%.

With reference to FIG. 1 and the like illustrating the first embodiment, the example is explained in which the projection-type display device 100 includes the projector 10 and the transmission-type screen 20; however, the projection-type display device 100 may include other components. For example, the projection-type display device 100 may include one or more of the following: a housing that houses therein the transmission-type screen 20 and the projector 10; a holding mechanism that fixes the transmission-type screen 20 and the projector 10; an air conditioning mechanism that adjusts the air within the projection-type display device 100; a speaker; a television stage; a signal receiving unit that receives signals from a remote control; an electric circuit; a geometric correction circuit; and a color correction circuit. Further, the light emitter may be an element having a continuous spectrum such as a lamp or an element having a discrete spectrum such as a laser or a Light Emitting Diode (LED).

As explained above, according to the first embodiment, the first light diffusing means 31 is provided on the viewer 1 side with respect to the entering-side Fresnel lens 32, whereas the second light diffusing means 41 is provided on the light-emitter side with respect to the second substrate 43. As a result, it is possible to mitigate image degradation caused by speckles and to display an image having high resolving power.

Further, because the first light diffusing means 31 is provided on the light-exiting-surface side of the first substrate 33, it is possible to position the first light diffusing means 31 so as to be closer to the second light diffusing means 41. Consequently, it is possible to improve the perceived level of resolution.

Furthermore, because the relative position between the first light diffusing means 31 and the second light diffusing means 41 is changed by changing the position of the first substrate 33, it is possible to change the relative position between the first light diffusing means 31 and the second light diffusing means 41 without causing the viewer to perceive the motion of the first substrate 33.

Second Embodiment

Next, a second embodiment of the present invention will be explained with reference to FIG. 16. As explained above, an arrangement is acceptable in which a medium having self-lubricating properties or a resilient member such as a gel-like medium is provided between the Fresnel lens screen 30 and the image display element 40. In the description of the second embodiment, a projection-type display device obtained in the case where a resilient member is provided between the Fresnel lens screen 30 and the image display element 40 will be explained.

Figure 16:
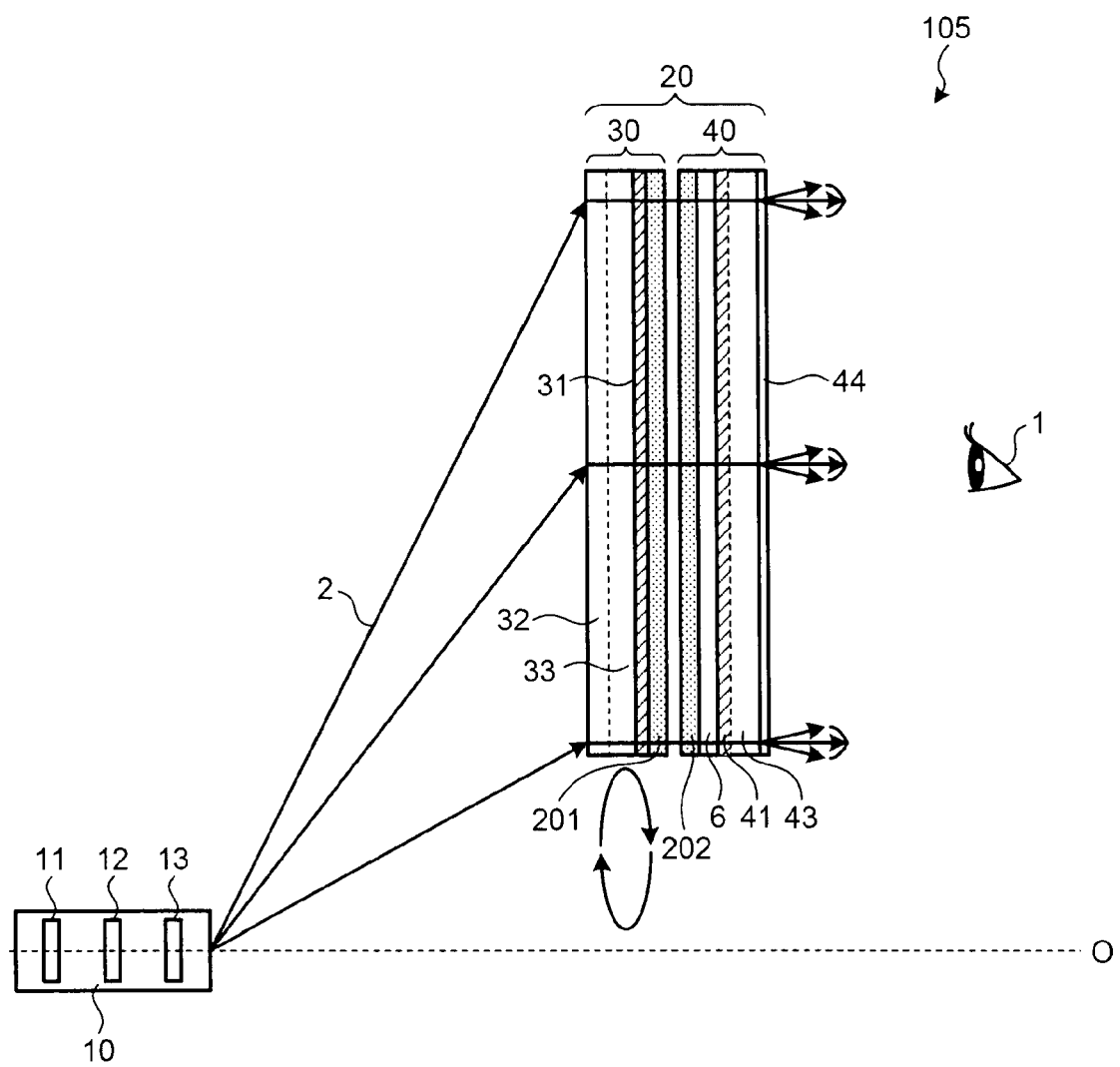
FIG. 16 is a drawing illustrating a configuration of a projection-type display device according to a second embodiment of the present invention.

FIG. 16 is a drawing illustrating a configuration of a projection-type display device according to the second embodiment. Some of the components shown in FIG. 16 that have the same functions as those in the projection-type display device 101 according to the first embodiment shown in FIG. 4 will be referred to by using the same reference numerals, and the duplicate explanation thereof will be omitted. A projection-type display device 105 according to the second embodiment has a resilient member provided between the Fresnel lens screen 30 (i.e., a first element) and the image display element 40 (i.e., a second element).

The Fresnel lens screen 30 included in the projection-type display device 105 includes: the entering-side Fresnel lens 32; the first substrate 33; the light diffusing means 31; and a first protection layer 201, which is a resilient member. The Fresnel lens screen 30 is configured so that the elements forming the Fresnel lens screen 30 are provided in the stated order below from the light-entering-surface side toward the light-exiting-surface side: the entering-side Fresnel lens 32; the first substrate 33; the light diffusing means 31; and the first protection layer 201.

The image display element 40 includes the lens element 6, the second substrate 43, the second light diffusing means 41, the surface treated layer 44, and a second protection layer 202, which is a resilient member. The image display element 40 is configured so that the elements forming the image display element 40 are provided in the stated order below from the light-entering-surface side toward the light-exiting-surface side: the second protection layer 202, the lens element 6, the second light diffusing means 41, the second substrate 43, and the surface treated layer 44.

As explained above, the projection-type display device 105 is configured so that the first protection layer 201 is provided on the light-exiting-surface side of the Fresnel lens screen 30, whereas the second protection layer 202 is provided on the light-entering-surface side of the image display element 40.

A spatial margin is provided between the Fresnel lens screen 30 and the image display element 40, so that the Fresnel lens screen 30 or the image display element 40 can be oscillated. Also, a spatial margin is provided between the Fresnel lens screen 30 and the image display element 40 for the warp that the Fresnel lens screen 30 and the image display element 40 each have in the initial state thereof or for deformations or the like caused by heat or moisture. However, if a warp or a deformation that is larger than expected is caused in the Fresnel lens screen 30 or the image display element 40 or if a vibration is applied to the Fresnel lens screen 30 or the image display element 40 during transportation, there is a possibility that a portion of the Fresnel lens screen 30 may temporarily come into contact with a portion of the image display element 40.

In that situation, if the portions that are in contact with each other are rubbed against each other and shaved, shaving may adhere to the Fresnel lens screen 30 or the image display element 40, or the Fresnel lens screen 30 or the image display element 40 may be damaged, so that inconvenience may be caused where uniformity of the projected image is degraded. In particular, in the case where the first light diffusing unit 31 included in the Fresnel lens screen 30 or the lens element 6 included in the image display element 40 has irregularity shapes on the surface thereof, the percentage of the surface of the Fresnel lens screen 30 or the image display element 40 being degraded is higher than in the case where the first light diffusing means 31 or the lens element 6 is flat without any irregularity shapes. To cope with this situation, according to the second embodiment, the first protection layer 201 is provided for the Fresnel lens screen 30, whereas the second protection layer 202 is provided for the image display element 40.

In the case where the first light diffusing means 31 is configured to diffuse light with irregularities formed on the surface thereof, the first protection layer 201 provided on the surface of the first light diffusing means 31 on the light-exiting-surface side is formed in such a manner that the film thickness of the layer (the thickness of the layer) is small for the purpose of keeping the irregularity shapes formed on the surface of the first light diffusing means 31 on the light-exiting-surface side.

The irregularity shapes are configured with glass-based or acrylic-based fine particles that are, for example, bead-shaped (e.g., having a spherical shape or a rugby-ball shape) and with a medium that holds the fine particles. The particle diameter of each of the irregularity shapes is, for example, approximately 1 micrometer to 50 micrometers (usually 5 micrometers to 20 micrometers) and is larger than the wavelength of visible light (approximately 380 nanometers to 780 nanometers). Thus, when the irregularity shapes formed on the surface of the first light diffusing means 31 each have a size of 1 micrometer to 50 micrometers, the film thickness of the first protection layer 201 is, for example, smaller than 1 micrometer. By forming the thin first protection layer 201 to keep the irregularity shapes formed on the surface of the first light diffusing means 31, it is possible to prevent the first light diffusing means 31 and the lens element 6 from coming into contact with each other, without degrading the light diffusing function. Consequently, it is possible to keep the irregularity shapes formed on the surface of the first light diffusing means 31 without degradation, while maintaining the light diffusing function of the first light diffusing means 31.

Further, in the case where the lens element 6 included in the image display element 40 has irregularity shapes formed on the surface thereof, it is a good idea to form the second protection layer 202 so as to be thin, like in the example in which the first light diffusing means 31 has irregularity shapes formed on the surface thereof. Because the pitch of the irregularities formed on the lens element 6 is, for example, approximately 10 micrometers to 200 micrometers, it is sufficient to form the film thickness of the second protection layer 202 so as to be, for example, approximately several micrometers. The first protection layer 201 and the second protection layer 202 are each formed with a medium having a high level of self-lubricating properties. More specifically, the first protection layer 201 and the second protection layer 202 are each formed with silicone oil, a silicone resin, or silicone.

With reference to FIG. 16, the example in which the projection-type display device 105 includes the first protection layer 201 and the second protection layer 202 is explained; however, another arrangement is acceptable in which the projection-type display device 105 includes one selected from the first protection layer 201 and the second protection layer 202. With this arrangement, the projection-type display device 105 has a simple structure. Thus, it is possible to improve productivity and to produce the projection-type display device 105 at a low cost.

In the case where the projection-type display device 105 includes both the first protection layer 201 and the second protection layer 202, it is possible to prevent, with a higher certainty, the abrasion caused by the Fresnel lens screen 30 and the image display element 40 coming into contact with each other than in the case where the projection-type display device 105 includes one selected from the first protection layer 201 and the second protection layer 202.

As explained above, according to the second embodiment, because the resilient member is provided between the Fresnel lens screen 30 and the image display element 40, it is possible to protect the light diffusing means 31 and the lens element 6 with a simple structure.

Third Embodiment

Next, a third embodiment of the present invention will be explained. According to the third embodiment, by configuring the film thickness and the refractive index of the first protection layer 201 as well as the film thickness and the refractive index of the second protection layer 202 so as to be at appropriate levels, it is possible to prevent transmittance of the signal light that goes through the Fresnel lens screen 30 and the image display element 40 from becoming lower.

As explained in the description of the second embodiment, in the case where the first light diffusing means 31 is configured to diffuse the light with the irregularities formed on the surface thereof, the first protection layer 201 provided on the surface of the first light diffusing means 31 is configured to have a film thickness of, for example, 1 micrometer for the purpose of keeping the irregularity shapes formed on the surface.

For example, when the refractive index of the first protection layer 201 is expressed as a refractive index $n_3$, whereas the film thickness of the first protection layer 201 is expressed as a film thickness h, it is possible to express the relationship between $n_3$, h, and $\lambda$ (the wavelength) as $n_3 h \sim (2m-1)\lambda/4$. When the film thickness h and the refractive index $n_3$ of the first protection layer 201 are adjusted so that m is a positive integer, the reflectance of the first protection layer 201 becomes lower, and the transmittance becomes higher. As explained above, by controlling the film thickness and the refractive index of the first protection layer 201, it is possible to prevent the transmittance of the signal light that goes through the Fresnel lens screen 30 from becoming lower, while protecting the irregularity shapes formed on the surface of the Fresnel lens screen 30. Consequently, the projected image light becomes brighter. In addition, on the contrary to the signal light, it is possible to reduce unnecessary light other than the signal light. As a result, it is possible to improve the Signal to Noise (S/N) ratio. Consequently, it is possible to obtain an image that is bright and has an excellent perceived level of resolution.

As for the first protection layer 201, it is possible to form the first protection layer 201 of which the film thickness h is controlled by, for example, soaking the Fresnel lens screen 30 in a solution having a refractive index of $n_3$ and slowly pulling the first protection layer 201 out of the solution. When the first protection layer 201 is formed by using this method, the first protection layer 201 is formed also on the surface of the entering-side Fresnel lens 32 (on the light-entering-surface side).

The size of each of the lenses included in the entering-side Fresnel lens 32 is approximately one tenth of the size of each of the pixels from the light bulb 12 that are enlarged and projected by the projection optical system 13 (For example, if the size of each of the projected pixels is 1 millimeter, the size of each of the lenses is approximately 100 micrometers). For this reason, the thickness of the first protection layer 201 that is smaller than 1 micrometer does not greatly change the light refraction direction or the light reflection direction of the entering-side Fresnel lens 32.

Even in the case where the first protection layer 201 is formed on the surface of the entering-side Fresnel lens 32, by configuring the first protection layer 201 so as to have an appropriate film thickness and an appropriate refractive index, it is possible to make the reflectance of the first protection layer 201 low and to make the transmittance of the first protection layer 201 high.

Also, in the case where the second protection layer 202 is formed on the image display element 40 while configuring the second protection layer 202 so as to have an appropriate film thickness and an appropriate refractive index, the second protection layer 202 is formed by performing the same process that is performed for the first protection layer 201. By forming the second protection layer 202 on the image display element 40 while configuring the second protection layer 202 so as to have an appropriate film thickness and an appropriate refractive index, it is possible to achieve the same advantageous effect as in the case where the first protection layer 201 is formed on the Fresnel lens screen 30.

As explained above, according to the third embodiment, by configuring the film thickness and the refractive index of the first protection layer 201 as well as the film thickness and the refractive index of the second protection layer 202 so as to be at appropriate levels, it is possible to prevent the transmittance of the signal light that goes through the Fresnel lens screen 30 and the image display element 40 from becoming lower. Consequently, it is possible to protect the surface of the light diffusing means 31 and the surface of the lens element 6, while preventing the transmittance of the signal light that goes through the Fresnel lens screen 30 and the image display element 40 from becoming lower.

Fourth Embodiment

Next, a fourth embodiment of the present invention will be explained with reference to FIGS. 17 and 18. In the fourth embodiment, another exemplary configuration of a projection-type display device in the case where a resilient member is provided between the Fresnel lens screen 30 and the image display element 40 will be explained as a modification example of the second embodiment.

Figure 17:
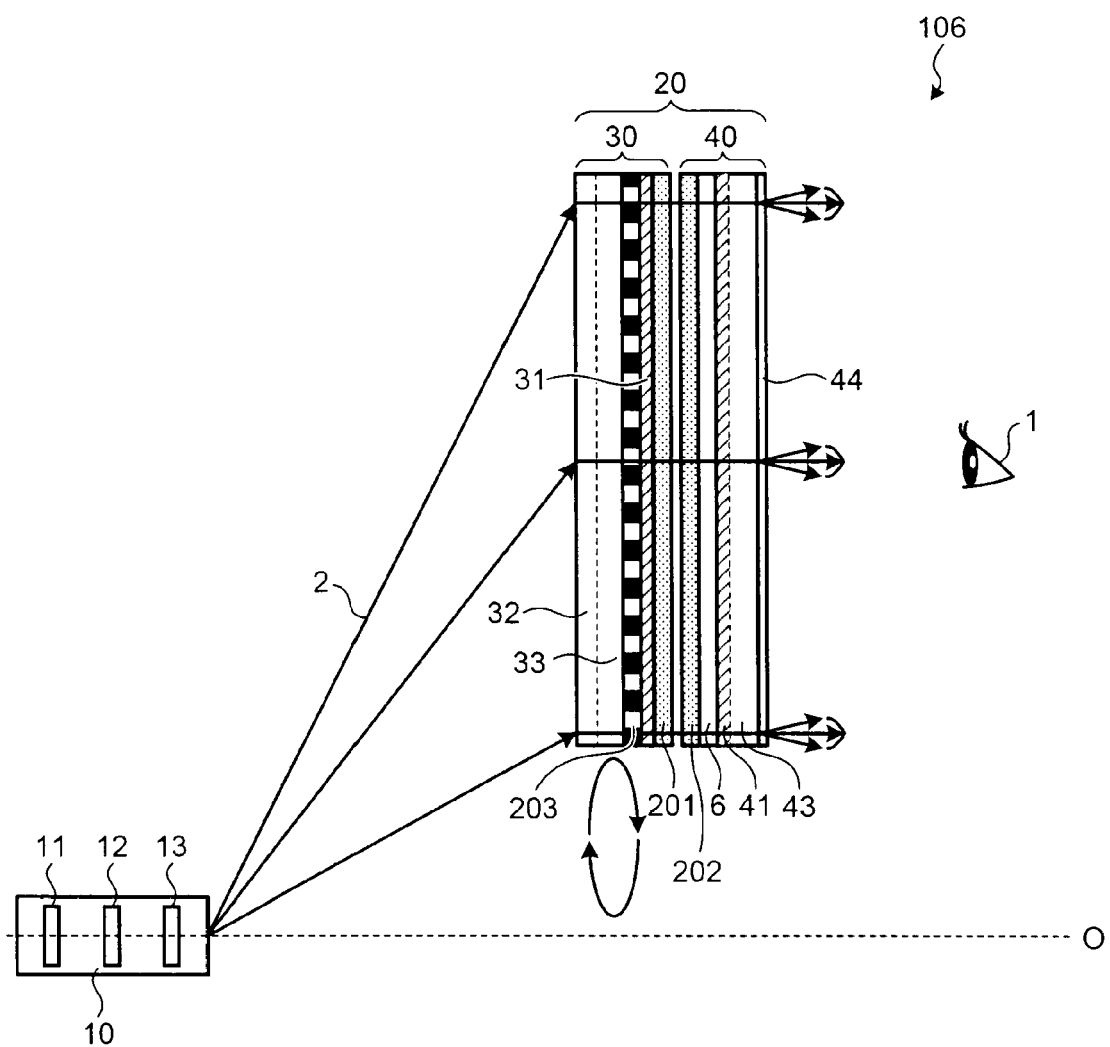
FIG. 17 is a first drawing illustrating a configuration of a projection-type display device according to a fourth embodiment of the present invention.

FIG. 17 is a drawing illustrating a configuration of a projection-type display device according to the fourth embodiment. Some of the components shown in FIG. 17 that have the same functions as those in the projection-type display devices 101 and 105 according to the first and the second embodiments shown in FIGS. 4 and 16 will be referred to by using the same reference numerals, and the duplicate explanation thereof will be omitted. A projection-type display device 106 according to the fourth embodiment has a resilient member provided between the Fresnel lens screen 30 and the image display element 40 and is also configured so that a layer that selectively transmits only predetermined signal light is provided on the light-entering-surface side of the first light diffusing unit 31.

The Fresnel lens screen 30 included in the projection-type display device 106 includes: the entering-side Fresnel lens 32; the first substrate 33; a selective light transmitting/absorbing layer 203; the light diffusing means 31, and the first protection layer 201, which is a resilient member. The Fresnel lens screen 30 is configured so that the elements forming the Fresnel lens screen 30 are provided in the order stated below from the light-entering-surface side toward the light-exiting-surface side: the entering-side Fresnel lens 32; the first substrate 33; the selective light transmitting/absorbing layer 203; the light diffusing means 31; and the first protection layer 201. The selective light transmitting/absorbing layer 203 is a layer that selectively transmits the signal light that is positioned on an optical path through which the light flux having been deflected by the entering-side Fresnel lens 32 toward the viewer side passes and absorbs the signal light that is positioned on the outside of the optical path.

Even if the transmission-type screen 20 having high resolving power is realized, when the contrast ratio (i.e., the ratio between brightness and darkness) is low and when, in particular, images are easily influenced by ambient light (i.e., when the contrast ratio under the bright ambient light condition is low), a problem remains where an image that is finely resolved may become obscure due to noises such as the ambient light.

To cope with this situation, according to the fourth embodiment, the selective light transmitting/absorbing layer 203 is provided on the light-exiting-surface side of the first substrate 33. With this arrangement, the Fresnel lens screen 30 is configured so that at least a part of the ambient light is absorbed by the selective light transmitting/absorbing layer 203. Further, the projection-type display device 106 is configured so that the first light diffusing unit 31 is provided on the light-exiting-surface side of the selective light transmitting/absorbing layer 203. Thus, it is possible to display an image having high resolving power while mitigating image degradation caused by speckles. In addition, by providing the first protection layer 201 on the light-exiting-surface side of the first light diffusing unit 31, it is possible to keep the irregularity shapes formed on the surface of the first light diffusing means 31 without degradation.

Figure 18:
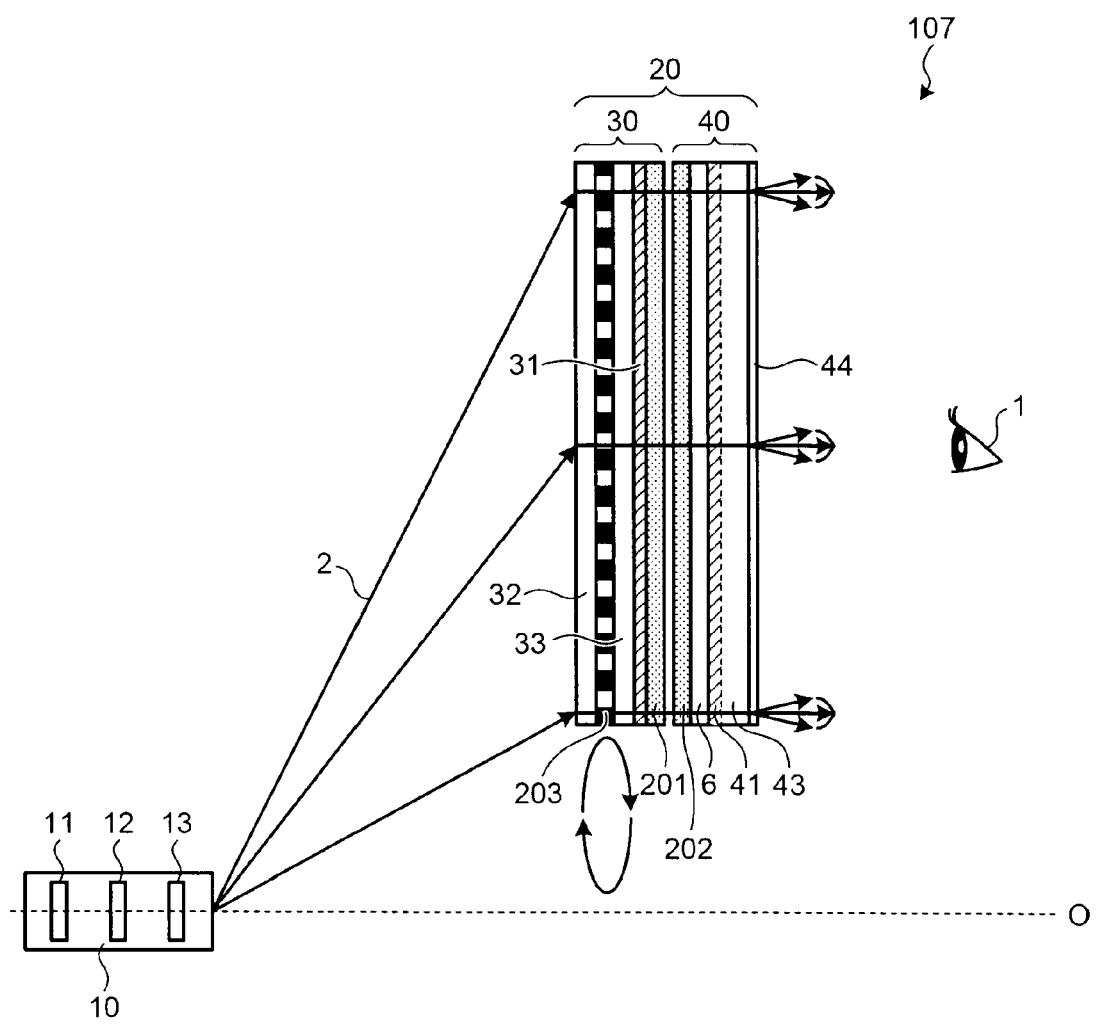
FIG. 18 is a second drawing illustrating a configuration of another projection-type display device according to the fourth embodiment of the present invention.

In the description of the fourth embodiment, the example is explained in which the selective light transmitting/absorbing layer 203 is provided on the light-exiting-surface side of the first substrate 33; however, another arrangement is acceptable in which, as in the projection-type display device 106 shown in FIG. 18, the selective light transmitting/absorbing layer 203 is provided on the light-entering-surface side of the first substrate 33.

As explained above, according to the fourth embodiment, the selective light transmitting/absorbing layer 203 is provided on the light-exiting-surface side of the entering-side Fresnel lens 32, while being provided on the light-entering-surface side of the first light diffusing unit 31. Thus, it is possible to display an image having high resolving power while mitigating image degradation caused by speckles.

INDUSTRIAL APPLICABILITY

As explained above, the transmission-type screen, the projection-type display device, and the image displaying method according to an aspect of the present invention are suitable for displaying images.

The invention claimed is:

1. A transmission-type screen for displaying an image onto which image light from a light emitter is radiated from a rear-surface side thereof, which is an opposite side to an image display side, the transmission-type screen comprising:
   a Fresnel optical element that inflects the image light from the light emitter toward the display side using a prism formed on a rear-surface side thereof, which is a light-entering-surface side of the image light;
   a first substrate that holds the Fresnel optical element;
   a first light diffusing unit that is provided on the display side with respect to the Fresnel optical element and diffuses the image light from the Fresnel optical element;
   a second light diffusing unit that is provided on the display side with respect to the first light diffusing unit, diffuses the image light from the first light diffusing unit, causes the diffused image light to exit toward the display side, and is configured to change a relative position thereof to the first light diffusing unit, the relative position being changed such that a moving light diffusing unit of the first light diffusing unit and the second light diffusing unit is moved in a circular path with respect to a stationary light diffusing unit of the first light diffusing unit and the second light diffusing unit, the circular path being parallel to a plane of a surface of the moving light diffusing unit, and a degree of haze of the moving light diffusing unit is less than a degree of haze of the stationary light diffusing unit; and
   a second substrate that is provided on the display side with respect to the second light diffusing unit and holds the second light diffusing unit.

2. The transmission-type screen according to claim 1, wherein the first light diffusing unit is provided on the first substrate, on the display side of the first substrate.

3. The transmission-type screen according to claim 1, wherein a relative position between the first light diffusing unit and the second light diffusing unit is changed by changing a position of the first substrate.

4. The transmission-type screen according to claim 1, wherein
   in the Fresnel optical element, a plurality of Fresnel prisms is provided in the manner of saw teeth, the Fresnel prisms each having a refraction surface for refracting the image light radiated from the rear-surface side and a reflection surface for reflecting a light beam that has been refracted on the refraction surface,
   the Fresnel optical element has a non-light-entering surface through which the image light does not enter because the image light that has entered the Fresnel optical element in a diagonal direction with respect to a main surface of the Fresnel optical element is refracted by the refraction surface, and
   the non-light-entering surface is formed so as to be substantially parallel to a main surface of the substrate.

5. The transmission-type screen according to claim 1, wherein
   in the Fresnel optical element, a plurality of Fresnel prisms is provided in the manner of saw teeth, the Fresnel prisms each having a refraction surface for refracting the image light radiated from the rear-surface side and a reflection surface for reflecting a light beam that has been refracted on the refraction surface, and
   in a tip portion of each of the Fresnel prisms where the refraction surface intersects the reflection surface, the Fresnel optical element has an entering-light-parallel-surface that is substantially parallel to an entering light beam of the image light.

6. The transmission-type screen according to claim 2, further comprising a protection layer that is provided between a first element having the Fresnel optical element, the first substrate, and the first light diffusing unit and a second element having the second substrate and the second light diffusing unit, is provided on a surface of the first element on a display side or on a surface of the second element on a rear-surface side, and protects the first element and the second element.

7. The transmission-type screen according to claim 6, wherein a thickness of the protection layer is smaller than 1 micrometer.

8. A projection-type display device comprising the transmission-type screen according to claim 1.

9. The transmission-type screen according to claim 1, wherein the degree of haze of an oscillating one of the first and second light diffusing units is in the range of approximately 30-60%.

10. The transmission-type screen according to claim 9, wherein the degree of haze of the other of the first and second light diffusing units is in the range of approximately 80-90%.

11. The transmission-type screen according to claim 1, further comprising a resilient member provided between the first light diffusing unit and the second light diffusing unit.

12. An image displaying method for displaying an image by radiating image light from a light emitter onto a transmission-type screen from a rear-surface side thereof, which is an opposite side to an image display side, the image displaying method comprising:
   a first step of inflecting the image light from the light emitter toward the display side using a Fresnel optical element formed on a rear-surface side, which is a light-entering-surface side of the image light;
   a second step of diffusing the image light from the Fresnel optical element using a first light diffusing unit that is provided on the display side with respect to the Fresnel optical element; and
   a third step of diffusing the image light from the first light diffusing unit using a second light diffusing unit and causing the diffused image light to exit toward the display side, while changing a relative position between the second light diffusing unit and the first light diffusing unit, the relative position being changed such that a moving light diffusing unit of the first light diffusing unit and the second light diffusing unit is moved in a circular path with respect to a stationary light diffusing unit of the first light diffusing unit and the second light diffusing unit, the circular path being parallel to a plane of a surface of the moving light diffusing unit, and a degree of haze of the moving light diffusing unit is less than a degree of haze of the stationary light diffusing unit, the second light diffusing unit being held by a substrate, being provided on a rear-surface side with respect to the substrate, and being provided on the display side with respect to the first light diffusing unit.

* * * * *